US012595074B2

(12) United States Patent
Tejeda et al.

(10) Patent No.: US 12,595,074 B2
(45) Date of Patent: Apr. 7, 2026

(54) ON-BOARD LUGGAGE SPACE AVAILABILITY INDICATORS

(71) Applicant: Panasonic Avionics Corporation, Irvine, CA (US)

(72) Inventors: Cesar Tejeda, Irvine, CA (US); Annie Lu, Irvine, CA (US); Shreyang Prajapati, Mission Viejo, CA (US); William Brinser, Lake Forest, CA (US); Danila Larin, Irvine, CA (US); Jeff Santiago, Mission Viejo, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 22 days.

(21) Appl. No.: 18/665,115

(22) Filed: May 15, 2024

(65) Prior Publication Data

US 2025/0353609 A1 Nov. 20, 2025

(51) Int. Cl.
B64D 45/00 (2006.01)
B64D 11/00 (2006.01)

(52) U.S. Cl.
CPC ............ B64D 45/00 (2013.01); B64D 11/003 (2013.01); *B64D 2045/007* (2013.01)

(58) Field of Classification Search
CPC . B64D 45/00; B64D 11/003; B64D 2045/007
See application file for complete search history.

(56) References Cited

U.S. PATENT DOCUMENTS

| | | | | |
|---|---|---|---|---|
| 7,636,038 B1 | 12/2009 | Nof et al. | | |
| 9,745,064 B2 * | 8/2017 | Balasubramanian | ........................ B64D 45/0005 |
| 9,764,842 B2 * | 9/2017 | Woicekowski | ........ B64D 45/00 |
| 9,869,574 B2 * | 1/2018 | Nicks | .................... B64D 11/003 |
| 10,189,406 B1 * | 1/2019 | Pozzi | ........................ B60Q 9/00 |
| 10,780,980 B2 * | 9/2020 | Riedel | ..................... B64F 1/368 |
| 10,996,051 B1 * | 5/2021 | Patel | ........................ G06Q 50/40 |
| 11,068,806 B2 * | 7/2021 | Savian | ............... G06Q 30/0633 |
| 12,017,775 B2 * | 6/2024 | Cloud | .................. B64D 11/003 |
| 12,172,753 B2 * | 12/2024 | Childress | ............... B64D 47/08 |
| 12,311,066 B2 * | 5/2025 | Childress | .................. A61L 2/24 |

(Continued)

OTHER PUBLICATIONS

Extended European Search Report issued Jul. 15, 2025, in European Patent Application No. 25176627.5 (8 pages).

*Primary Examiner* — John A Tweel, Jr.

(74) *Attorney, Agent, or Firm* — Perkins Coie LLP

(57) ABSTRACT

Systems, methods, and devices for configuring and using on-board luggage space availability indicators are provided. An example method includes initializing multiple sensors, each of which includes a receiver, in an interior space of an overhead bin, using the receiver in each of the multiple sensors to acquire a signal, and determining, based on the received signals, an amount of empty space corresponding to a respective sensor of the multiple sensors. Based on the amount of empty space indicated by each of the multiple sensors, one of multiple visual indicators is selected. Herein, each of the multiple visual indicators is indicative of a different available capacity of the overhead bin, e.g., a first visual indicator indicates the overhead bin is empty, whereas a last visual indicator indicates the overhead bin has no more space for additional luggage. The overhead bin visual indicator is then displayed using a light-emitting means.

20 Claims, 18 Drawing Sheets

(56) References Cited

U.S. PATENT DOCUMENTS

| | | | | |
|---|---|---|---|---|
| 2015/0241209 A1* | 8/2015 | Jouper | ..................... | G01C 5/00 |
| | | | | 702/156 |
| 2016/0109280 A1* | 4/2016 | Tiu | .......................... | G01F 17/00 |
| | | | | 702/173 |
| 2017/0152044 A1 | 6/2017 | Balasubramanian | | |
| 2019/0283880 A1* | 9/2019 | Agarwala | .......... | B64D 11/0015 |
| 2022/0177135 A1* | 6/2022 | Shetty | ..................... | E05F 15/73 |
| 2023/0039908 A1 | 2/2023 | Patel et al. | | |
| 2024/0353223 A1* | 10/2024 | Patel | ................. | G01B 11/2513 |

* cited by examiner

Sensor/Emitter

04 ABC

04 ABC

04 ABC

1310 Calibrate ultrasonic sensors

1320 Compare clear overhead bin data to new sensor readings

1332 Measure occupancy of the overhead bin

1334 Calculate the use of each sector of the overhead bin

1336 Estimate total overhead bin usage

1338 Apply rounded total color to the overhead bin LED

1340 Send updated bin status to the headend

For each overhead bin

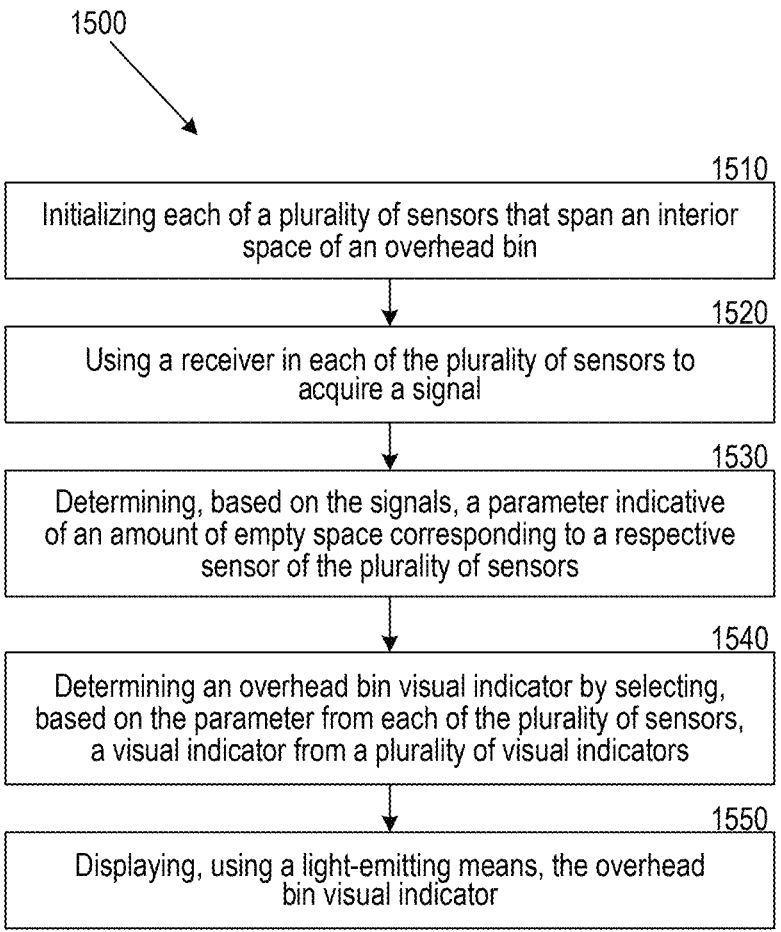

1500

1510
Initializing each of a plurality of sensors that span an interior space of an overhead bin 1520
Using a receiver in each of the plurality of sensors to acquire a signal 1530
Determining, based on the signals, a parameter indicative of an amount of empty space corresponding to a respective sensor of the plurality of sensors 1540
Determining an overhead bin visual indicator by selecting, based on the parameter from each of the plurality of sensors, a visual indicator from a plurality of visual indicators 1550
Displaying, using a light-emitting means, the overhead bin visual indicator

*FIG. 15*

ON-BOARD LUGGAGE SPACE AVAILABILITY INDICATORS

TECHNICAL FIELD

This document is generally related to systems, methods, and apparatus to improve the user experience in commercial passenger vehicles such as airplanes, passenger trains, buses, cruise ships, and other forms of transportation.

BACKGROUND

In commercial passenger vehicles, passengers are allowed to carry a limited number of smaller bags with them in the vehicle, which typically contain valuables and items needed during the journey. There is normally storage space provided for hand luggage, either under seating, or in overhead lockers. Hand baggage allowance is a topic frequently discussed in the context of commercial air travel. On the one hand, passengers may want to have more of their possessions at hand during flight, skip the often time-consuming baggage claim process, and avoid the risk of having their checked baggage lost or damaged. On the other hand, safety concerns, takeoff weight limitations, and financial incentives (e.g. charging for checked bags) cause airlines to impose limits on how much and what passengers can take into the aircraft cabin.

SUMMARY

This patent document describes, among other things, various implementations for improving storage capabilities for hand luggage for commercial passenger vehicles. In an example, this is achieved by using smart space indicators for the on-board luggage space, which can indicate how full, for example, an overhead bin currently is, and whether luggage can be rearranged to better accommodate all the cabin baggage in a particular flight.

In an aspect, a system for providing space availability indications for an overhead bin in an aircraft includes a plurality of sensors configured to enable detection of a parameter indicative of a usable amount of space within the overhead bin, a light-emitting means configured to display a plurality of visual indicators, a power supply coupled to the plurality of sensors and the light-emitting means, and at least one processor configured to select, based on the parameter, an overhead bin visual indicator from the plurality of visual indicators, display the overhead bin visual indicator using the light-emitting means, and transmit the overhead bin visual indicator for the overhead bin to an on-board server and/or a crew tablet. In this example system, each of the plurality of sensors comprises a receiver, and signals into receivers of the plurality of sensors span an interior space of the overhead bin. Furthermore, each of the plurality of visual indicators is indicative of a different available capacity of the overhead bin, with a first visual indicator of the plurality of visual indicators being indicative of the overhead bin being empty, and a last visual indicator of the plurality of visual indicators being indicative of the overhead bin having no more space for additional luggage. In this system, the light-emitting means is located adjacent to a seat number plate associated with the overhead bin.

In another aspect, an apparatus for providing space availability indications for an overhead bin in an aircraft includes at least one processor configured to initialize multiple sensors, with each of the multiple sensors comprising a receiver, and signals into receivers of the multiple sensors spanning an interior space of the overhead bin when the overhead bin is empty. For each of the multiple sensors, the at least one processor is further configured to use the receiver to acquire a signal, and determine, based on the signal, a parameter indicative of an amount of empty space corresponding to a respective sensor of the multiple sensors. In this example, the at least one processor determines an overhead bin visual indicator by selecting, based on the parameter from each of the multiple sensors, a visual indicator from multiple visual indicators. Herein, each of the multiple visual indicators is indicative of a different available capacity of the overhead bin, with a first visual indicator of the multiple visual indicators being indicative of the overhead bin being empty, and a last visual indicator of the multiple visual indicators being indicative of the overhead bin having no more space for additional luggage. The at least one processor further configured to then display, using a light-emitting means, the overhead bin visual indicator.

In yet another aspect, a method of providing space availability indications for an overhead bin in an aircraft includes initializing multiple sensors, with each of the multiple sensors comprising a receiver, and signals into receivers of the multiple sensors spanning an interior space of the overhead bin when the overhead bin is empty. For each of the multiple sensors, the method includes using the receiver to acquire a signal, and determining, based on the signal, a parameter indicative of an amount of empty space corresponding to a respective sensor of the multiple sensors. In this example, determining an overhead bin visual indicator includes selecting, based on the parameter from each of the multiple sensors, a visual indicator from multiple visual indicators. Herein, each of the multiple visual indicators is indicative of a different available capacity of the overhead bin, with a first visual indicator of the multiple visual indicators being indicative of the overhead bin being empty, and a last visual indicator of the multiple visual indicators being indicative of the overhead bin having no more space for additional luggage. The method then displays, using a light-emitting means, the overhead bin visual indicator.

In yet another aspect, the above-described method is embodied in the form of processor-executable code and stored in a computer-readable program medium.

In yet another aspect, a device that is configured or operable to perform the above-described method is disclosed.

The above and other aspects and their implementations are described in greater detail in the drawings, the description, and the claims.

BRIEF DESCRIPTION OF THE DRAWINGS

FIG. 15 shows a flowchart for an example method of providing a space availability indication in an overhead bin in an airplane.

DETAILED DESCRIPTION

Both flight attendants and passengers agree that the boarding process can be one of the most stressful aspects of airline travel. The boarding process leading up to departure includes the crew being tasked with getting everyone seated, ensuring all items in the galley and cabin are put away according to regulation, and completing all of their safety checks. However, as the crew prepares the airplane for takeoff, passengers are racing to secure space in the overhead bin.

Every traveler wants to place their bags directly above their seat for easy access during the flight, and so they can quickly grab and go once the plane lands. But there are multiple passengers in each row, and the overhead space above an airline seat is not guaranteed or reserved for those sitting in that particular row. Adding to the problem, luggage is not uniform. Some travelers ignore size limits or stick their personal items and coats in the overhead compartment instead of by their feet. Others place their roller bags horizontally instead of wheels out. This regularly leads to delays in the airplane taking off, which results in lower profits for the airline and greater stress for the passengers.

Embodiments of the disclosed technology provide smart indicators for luggage spaces for commercial vehicles, which ameliorate the abovementioned drawbacks to both crews and passengers. The smart indicators provide user-friendly indications for the amount of available space in a particular luggage space (or bin), and can also be configured to alert crew members when the luggage in two or more bins can be rearranged to provide additional space. Various implementations are discussed in detail with reference to the figures below. In the descriptions, an airplane is described as an example of the passenger vehicle, but the implementations of the disclosed technology can be applicable to other passenger vehicles such as buses, trains, ships, and other types of commercial passenger vehicles.

Figure 1A:
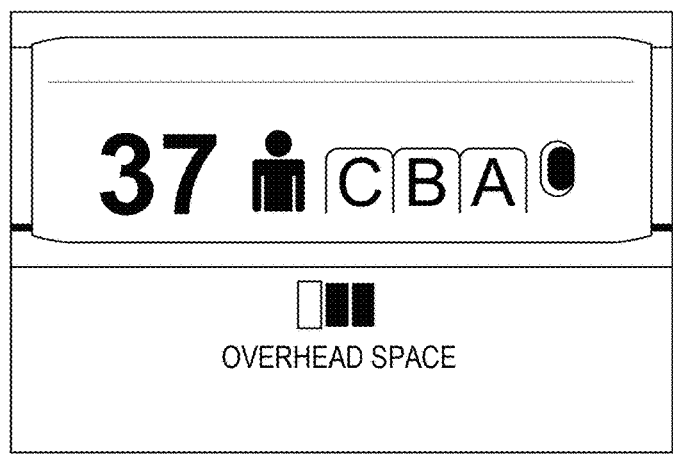
FIGS. 1A-IC show examples of different states for overhead space indicators.
Figure 1B:
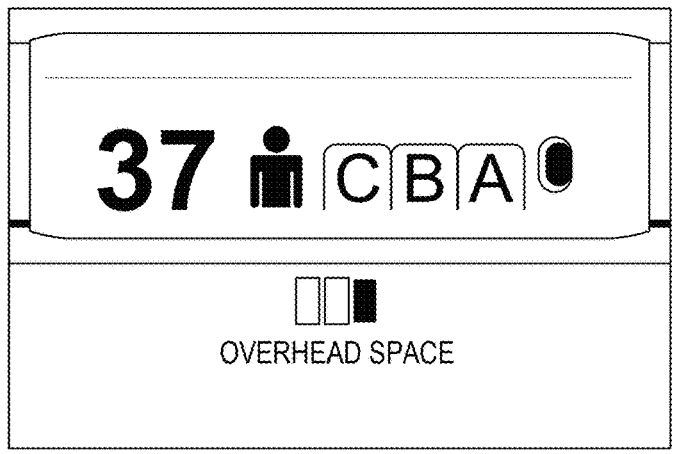
Figure 1C:
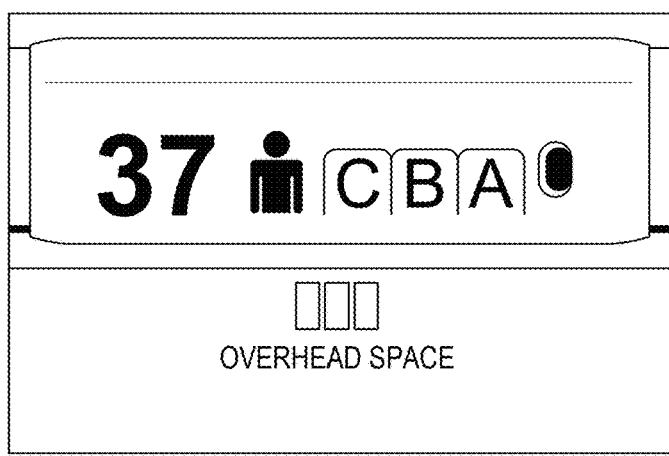

FIGS. 1A-IC show examples of different states for overhead space indicators. As shown therein, the overhead space indicator is configured to display one to three bars to indicate the amount of empty space in the bin associated with that overhead space indicator. As previously discussed, the overhead space indicator may correspond to multiple seats in the commercial vehicle, e.g., the overhead space indicator in FIGS. 1A-IC indicates the amount of empty space available to the passengers sitting in seats A, B and C in row 37. One bar (in FIG. 1A) indicates that the overhead bin is empty (or relatively empty), two bars (in FIG. 1B) indicate more luggage is present but further luggage can be accommodated, and three bars (in FIG. 1C) indicate that the overhead bin is full, and no more luggage can be fit into that overhead bin. In some embodiments, the bars in the different states (e.g., empty, half-full, and completely full) may be color coded to improve user visibility, e.g., a single bar is colored green, two bars are colored yellow, and three bars are colored red (to present a familiar "traffic light" pattern to the passengers). In other embodiments, the bars may be replaced with an icon or the airline logo, e.g., the Southwest™ "heart" symbol. In this example, an empty (or relatively empty) overhead bin can be indicated with a single Southwest™ "heart" symbol, and a completely full overhead bin can be indicated with three consecutive symbols.

Figure 2A:
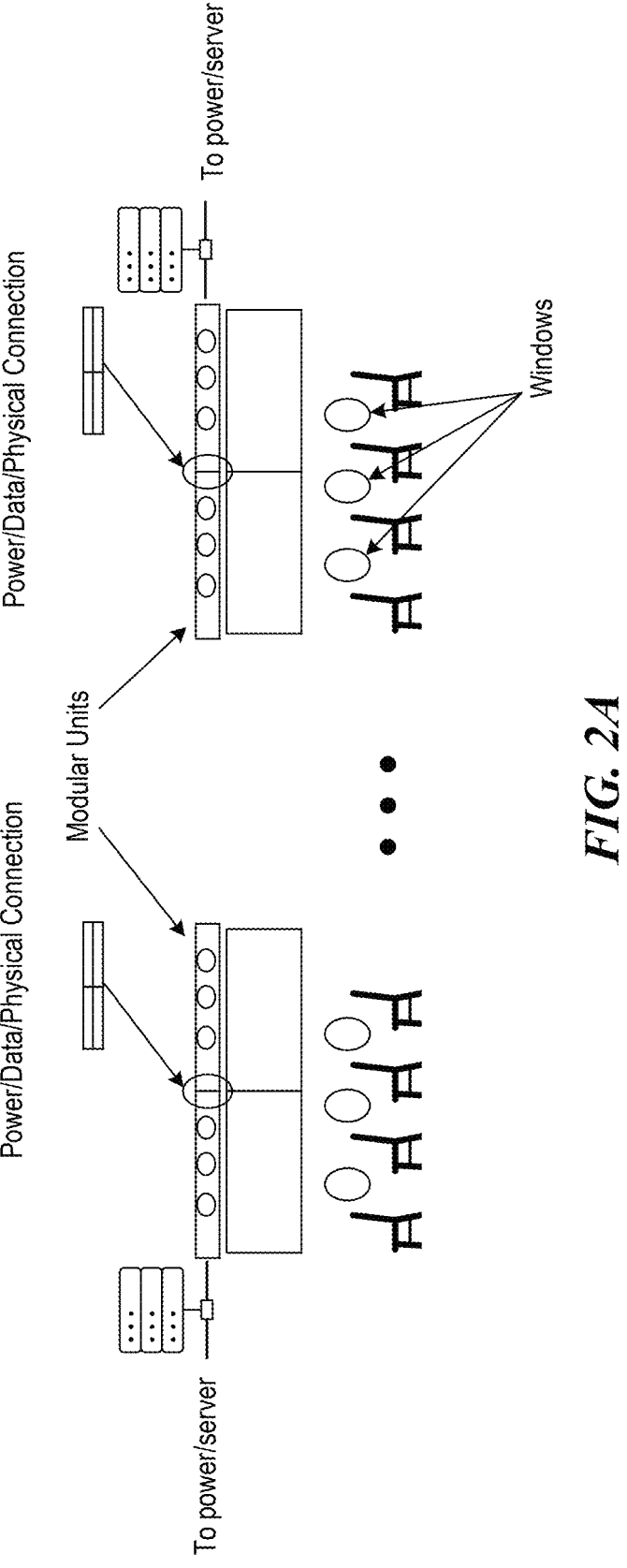
FIGS. 2A-2C show example system configurations for overhead space indicators.
Figure 2B:
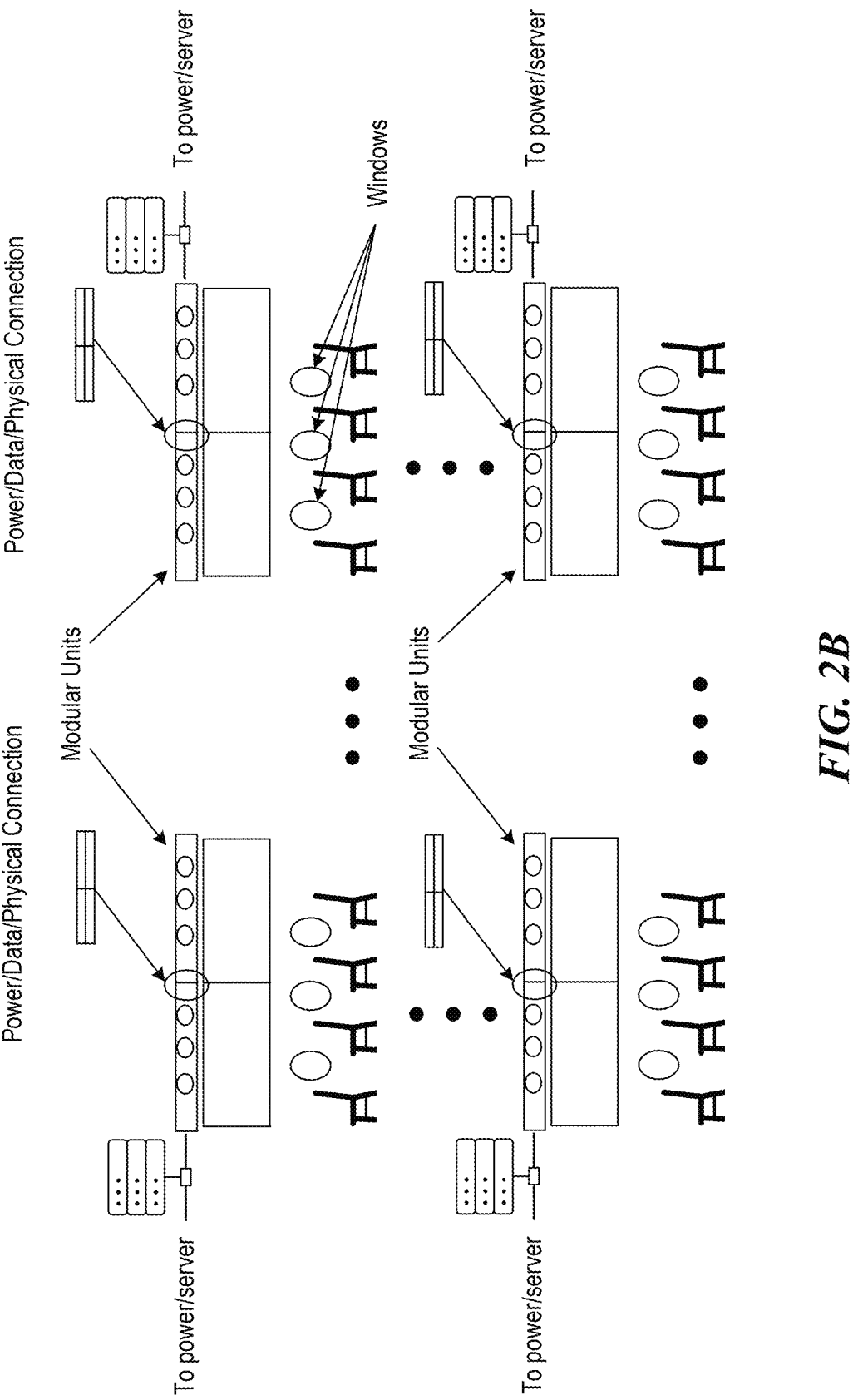
Figure 2C:
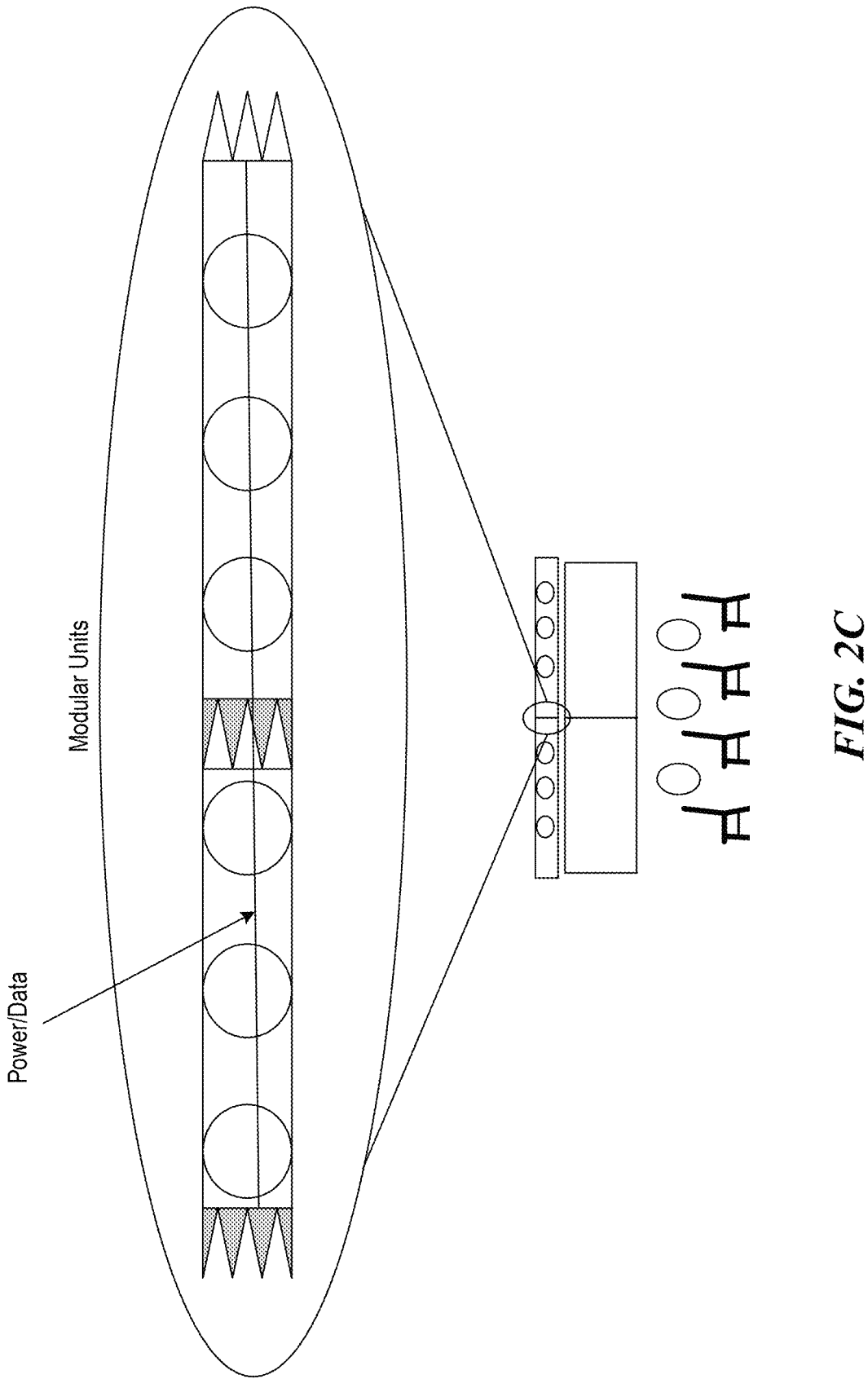

FIGS. 2A-2C show example system configurations for overhead space indicators. As shown in FIG. 2A, the overhead space indicators are part of a modular plug-and-play system that can be fastened adjacent to the corresponding window and/or row of seats. The modular units, which include the overhead space indicators, may be fastened either above the seats (e.g., on the ceiling of the commercial vehicle) or below the seats (e.g., on the floor along the aisle of the vehicle). In some embodiments, the modular units are attached using tape, glue, epoxy, screws, or the like. As shown in FIG. 2A, the modular units are outfitted with power and data connectors that are communicatively coupled to a power source and/or server. FIGS. 2B and 2C include aspects and features that are similar to those described in FIG. 2A, and will not be repeated in the description of the alternative system configurations.

FIG. 2B shows an example system configuration in which the modular units, which include the overhead space indicators, are configured to support the overhead bins for multiple rows of the aircraft. FIG. 2C shows an example of a single physical connection being used for both data communication and a power supply for the modular units. In other examples, two physical connections may be used; one for data communication and the other for power supply. As shown in FIG. 2C, the modular units are designed with a male connector on one end and a female connector on the other end, which enables the modular units to be easily connected, dis-connected, and/or rearranged. This advantageously enables units to be replaced without needing to modify the overhead bin structural framework. In some examples, the connectors include one or more of magnetic connectors, spring loaded contacts (or "pogo pins"), latches, sliders, and the like. In some examples, the modular units are connected to a single unit that operates as both the data server and the power supply. In other examples, the data server is distinct from the power supply, and both are connected to the modular units (using a single or two separate connectors).

Figure 3A:
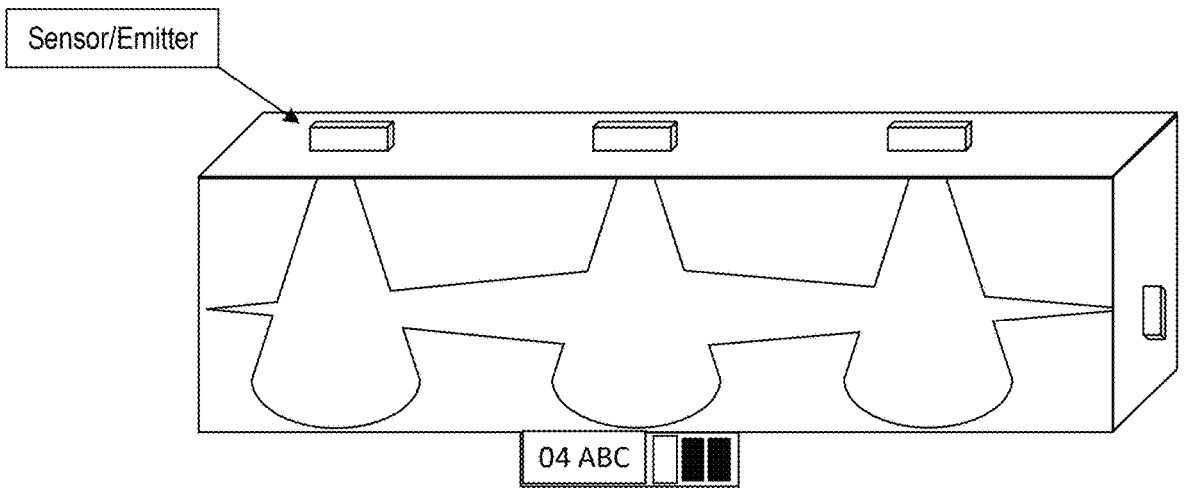
FIGS. 3A-3C show examples of overhead bins with varying amounts of luggage that correspond to different states for the overhead space indicator.
Figure 3B:
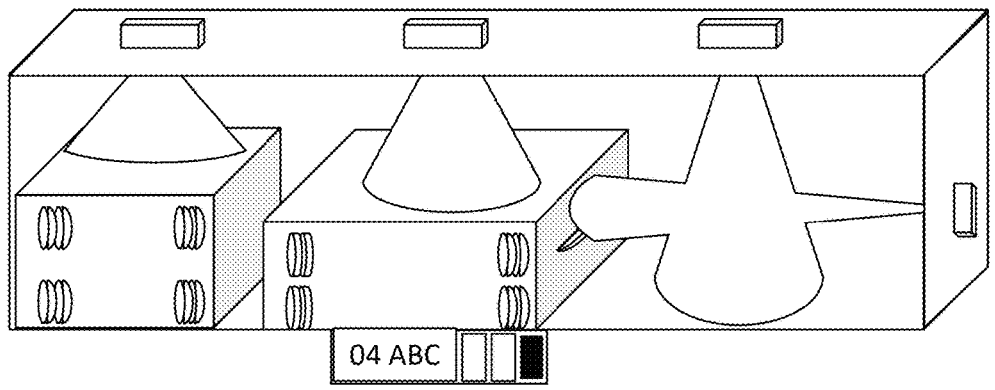
Figure 3C:
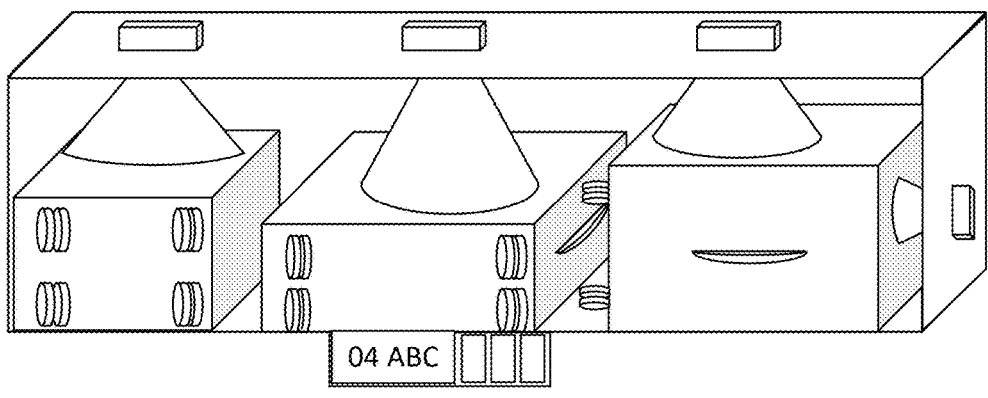

FIGS. 3A-3C show examples of varying amounts of luggage in an overhead bin that corresponds to different states for the overhead space indicator shown in FIGS. 1A-IC, respectively. As shown in FIG. 3A, an empty overhead bin corresponds to sensors and emitters detecting no luggage therein, whereas FIGS. 3B and 3C show the detection of two and three pieces of luggage, corresponding to a half-empty (or half-full) overhead bin and completely full overhead bin, respectively.

Embodiments of the disclosed technology provide smart space indicators using ultrasonic emitters and receiver (e.g., as described in FIGS. 4 and 5A-5C) or cameras with an infrared (IR) illumination floodlight (e.g., as described in FIGS. 6 and 7A-7C).

Figure 4:
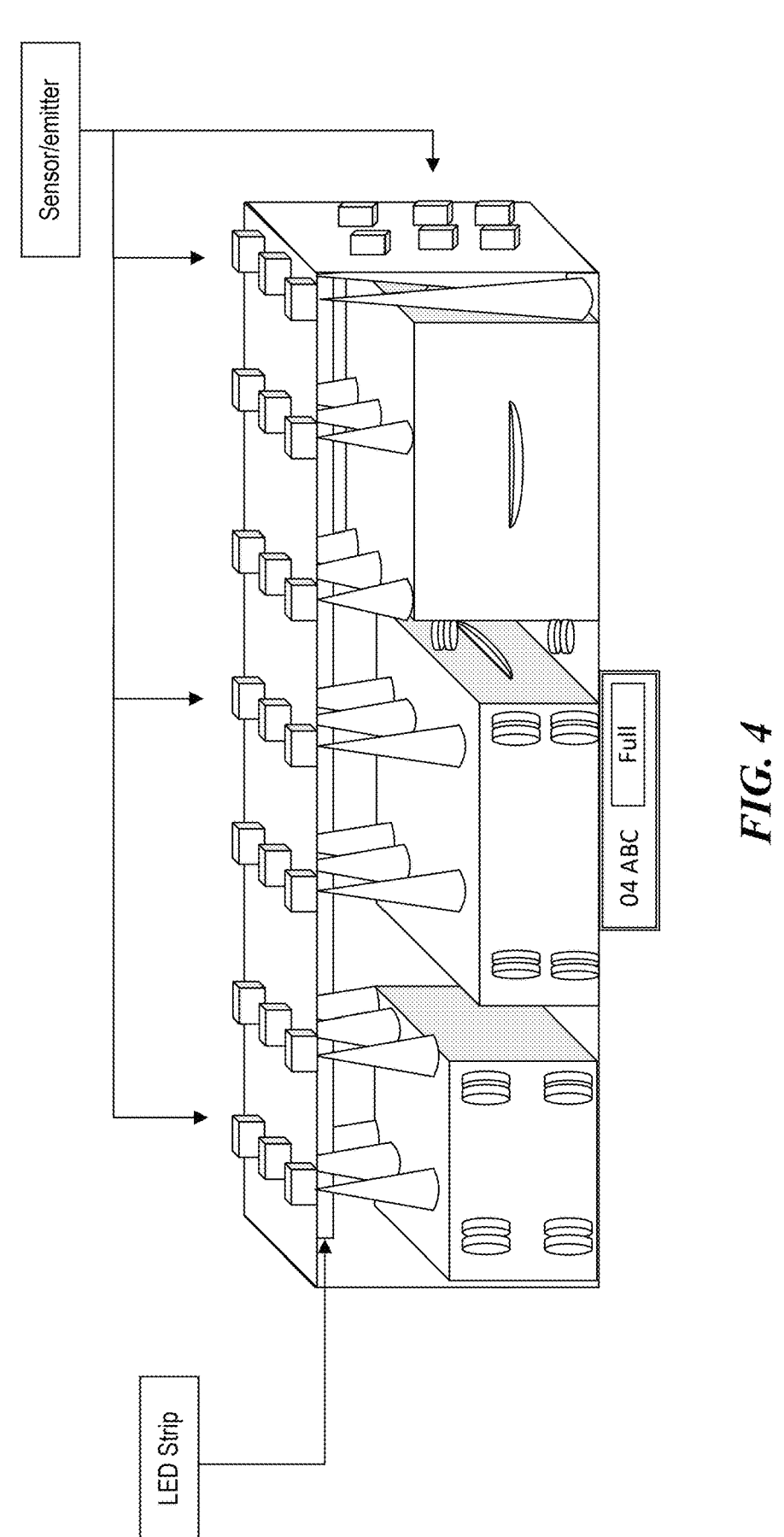
FIG. 4 shows an example sensor/emitter system with an overhead space indicator.

FIG. 4 shows an example sensor/emitter system that enables the functionality of an overhead space indicator. As shown therein, the system includes multiple ultrasonic sensors (or receivers) and emitters arranged in a matrix configuration such that the emitted signals span the entirety of the overhead bin, a light-emitting diode (LED) strip, and the smart space indicator. As shown in FIG. 4, the overhead bin is full, which is indicated on the smart space indicator below the overhead bin (e.g., using a red background or font). Various components of the example sensor/emitter system shown in FIG. 4 are further detailed in FIGS. 5A-5C.

Figures 5A, 5B, 5C:
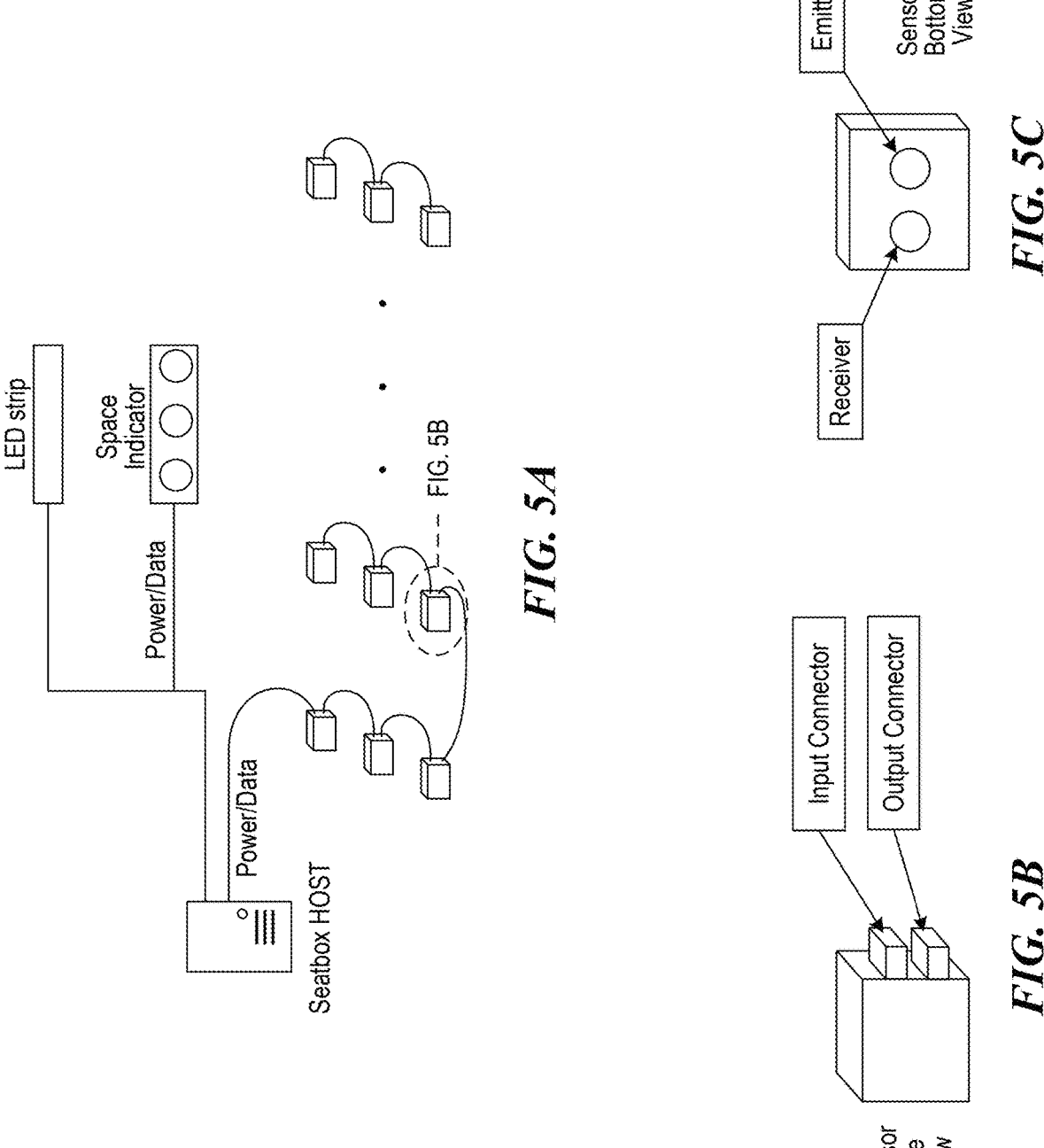
FIGS. 5A-5C show different components of the example sensor/emitter system.

FIG. 5A shows the data server and power supply (e.g., the seatbox host), the smart space indicator and the LED strip, both of which are communicatively coupled to the data server and the power supply using a single (combined) data and power connector. In some examples, the smart space indicator can be implemented using a single Red-Green-Blue (RGB) LED. In other examples, an LED screen or three different colored LEDs can be used to indicate the status of the smart space indicator. In example implementations, the RGB LED can be controlled via a WS2812B protocol (or a similarly-structured protocol), whereas the LED screen can be controlled via a RS 232/I2C/SPI protocol (or a similarly-structured protocol). In this example, the smart space indicator may be located next to or under the seat number plate. In addition to the LED (or LED screen) being configured to display the appropriate color (or airline logo), the LED strip may be configured to display the same color by the seatbox host. In the described embodiments, the LED and/or LED strip are turned on only during the onboarding process, e.g., prior to the cabin crew making last minute safety announcements and take off.

The seatbox host is also connected to each of the ultrasonic emitter/sensor modules. An example of the ultrasonic emitter/sensor module is shown in its side view (in FIG. 5B) and its front view (in FIG. 5C). As shown in FIG. 5B, the ultrasonic emitter/sensor module includes an input connector and an output connector, which may be communicatively coupled to one or more line-replaceable units (LRUs) via SPI (e.g., full-duplex communication) or 12C (e.g., half-duplex communication). FIG. 5C shows the front view of the ultrasonic emitter/sensor module, which includes the emitter (that emits the ultrasonic signal) and the receiver (which receives a reflection of the emitted ultrasonic signal). Based on the emitted and received signals, the distance between the luggage and a particular sensor can be determined, which enables the amount of space in the overhead bin to be calculated. The calculation of the empty space is used to determine the color displayed by the LED and/or LED strip.

Figure 6:
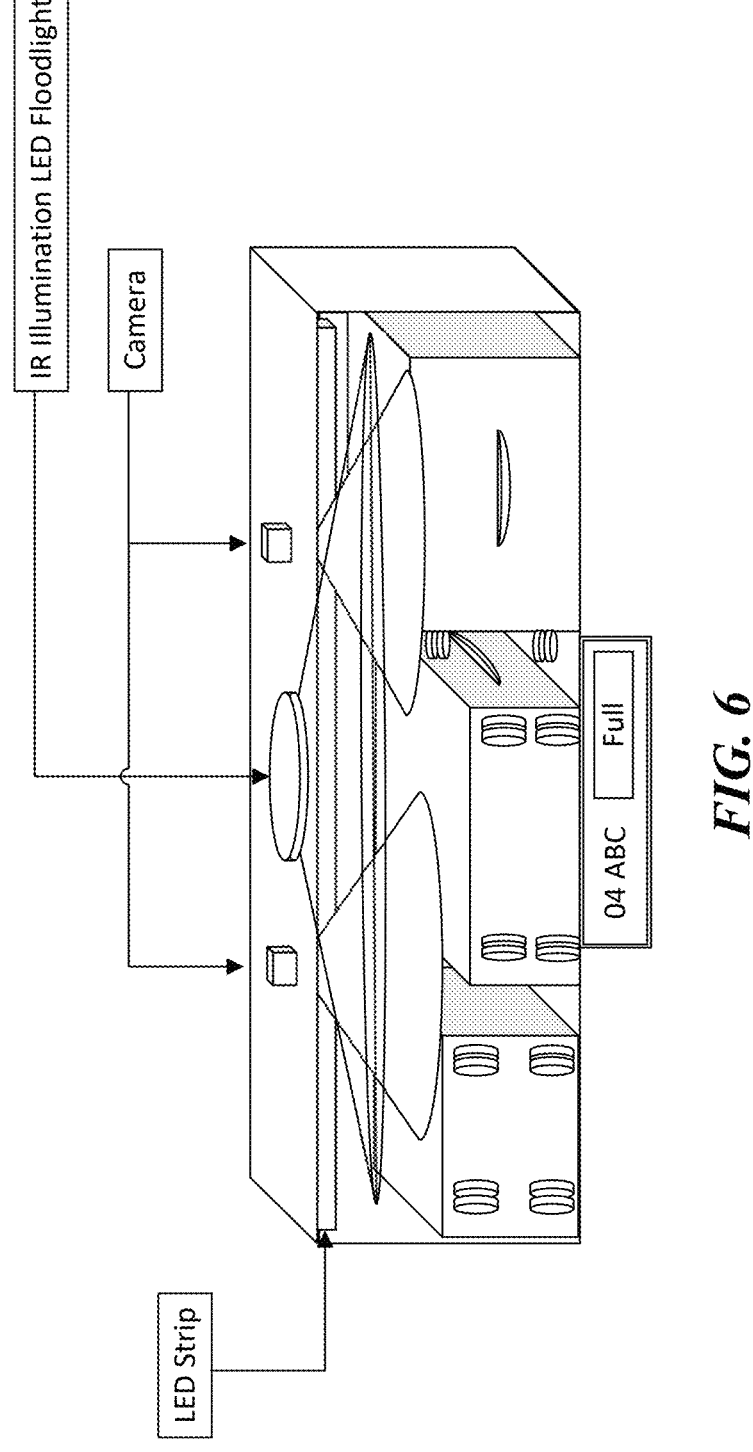
FIG. 6 shows an example infrared/camera system with an overhead space indicator.

FIG. 6 shows an example infrared/camera system that enables the functionality of an overhead space indicator. As shown therein, the system includes an infrared (IR) illumination LED floodlight, cameras arranged within the overhead bin such that their field-of-views span the entirety of the overhead bin, a light-emitting diode (LED) strip, and the smart space indicator. As shown in FIG. 6, the overhead bin is full, which is indicated on the smart space indicator below the overhead bin (e.g., using a red background or font). Various components of the example infrared/camera system shown in FIG. 6 are further detailed in FIGS. 7A-7C, 8A-8B and 9A-9B.

Figures 7A, 7B, 7C:
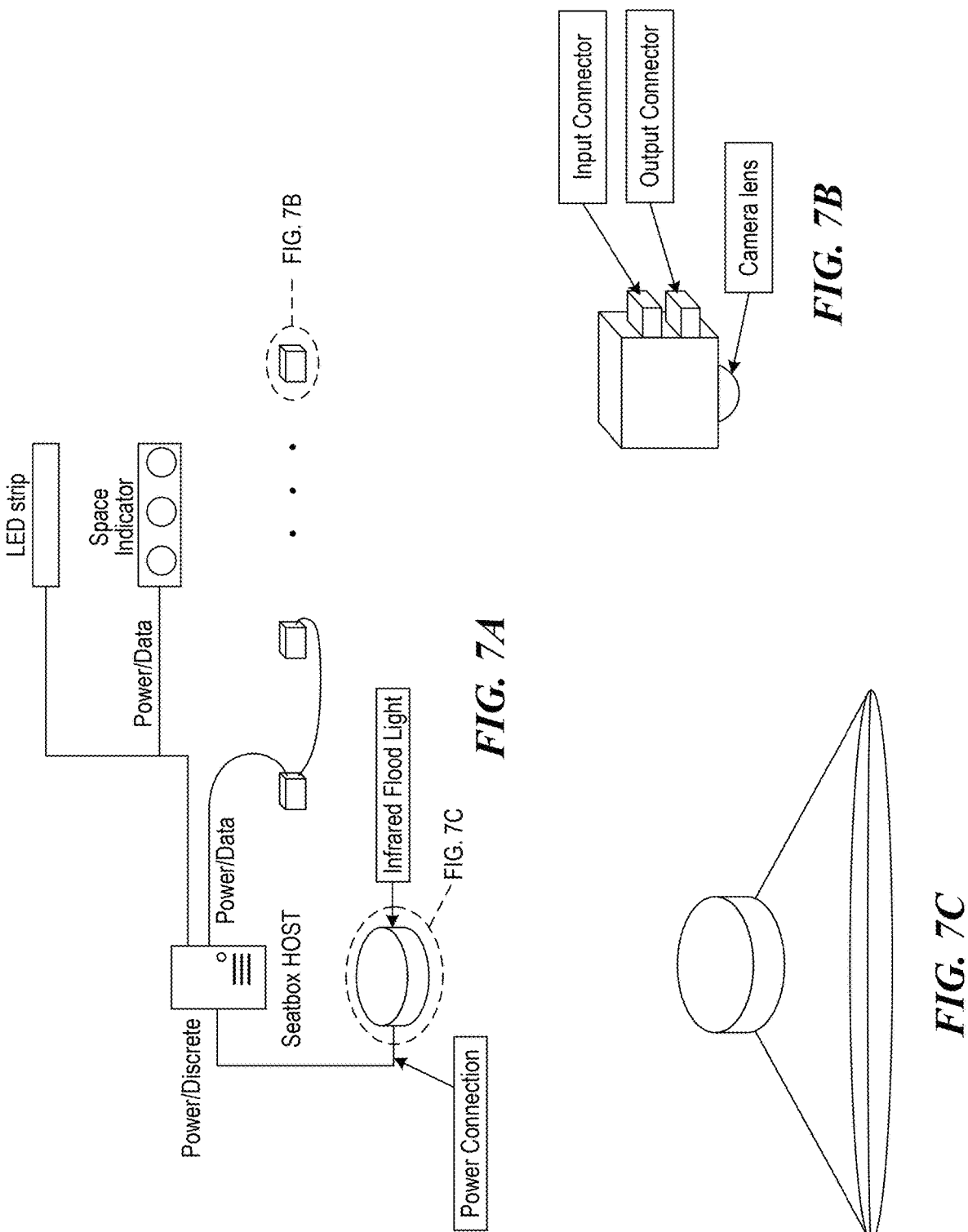
FIGS. 7A-7C show different components of the example infrared/camera system.

FIG. 7A shows the data server and power supply (e.g., the seatbox host), the smart space indicator and the LED strip, both of which are communicatively coupled to the data server and the power supply using a single (combined) data and power connector. In some examples, the smart space indicator can be implemented using a single red-green-blue (RGB) LED. In other examples, an LED screen or three different colored LEDs can be used to indicate the status of the smart space indicator. In example implementations, the RGB LED can be controlled via a WS2812B protocol (or a similarly-structured protocol), whereas the LED screen can be controlled via a RS 232/I2C/SPI protocol (or a similarly-structured protocol). In this example, the smart space indicator may be located next to or under the seat number plate. In addition to the LED (or LED screen) being configured to display the appropriate color (or airline logo), the LED strip may be configured to display the same color by the seatbox host. In the described embodiments, the LED and/or LED strip are turned on only during the onboarding process, e.g., prior to the cabin crew making last minute safety announcements and take off.

The seatbox host is also connected to each of the camera modules (via a combined power/data physical connection) and the IR floodlight (via a direct power connection). An example of the camera module is shown in FIG. 7B and the IR illumination floodlight is shown in FIG. 7C. As shown in FIG. 7B, the camera module includes an input connector and an output connector, which may be communicatively coupled to one or more line-replaceable units (LRUs) via SPI (e.g., full-duplex communication), Universal Serial Bus (USB), or a Base-T1 Ethernet connector. FIG. 7C shows the IR illumination floodlight, which may be configured with multiple infrared light emitting sources (e.g., IR LEDs) arranged on a "puck"-like module such that the entire interior of the overhead bin is illuminated when the IR floodlight is turned on. Using IR light is advantageous because it does not illuminate the cabin and is not visible to the passengers, but enhances the functionality of the camera modules in low-light conditions. The camera module shown in FIG. 7B further includes a camera lens that continuously (or periodically) monitors the interior of the overhead bin, which enables the amount of available space to be determined. The calculation of the amount of available space is used to determine the color displayed by the LED and/or LED strip.

Figures 8A, 8B:
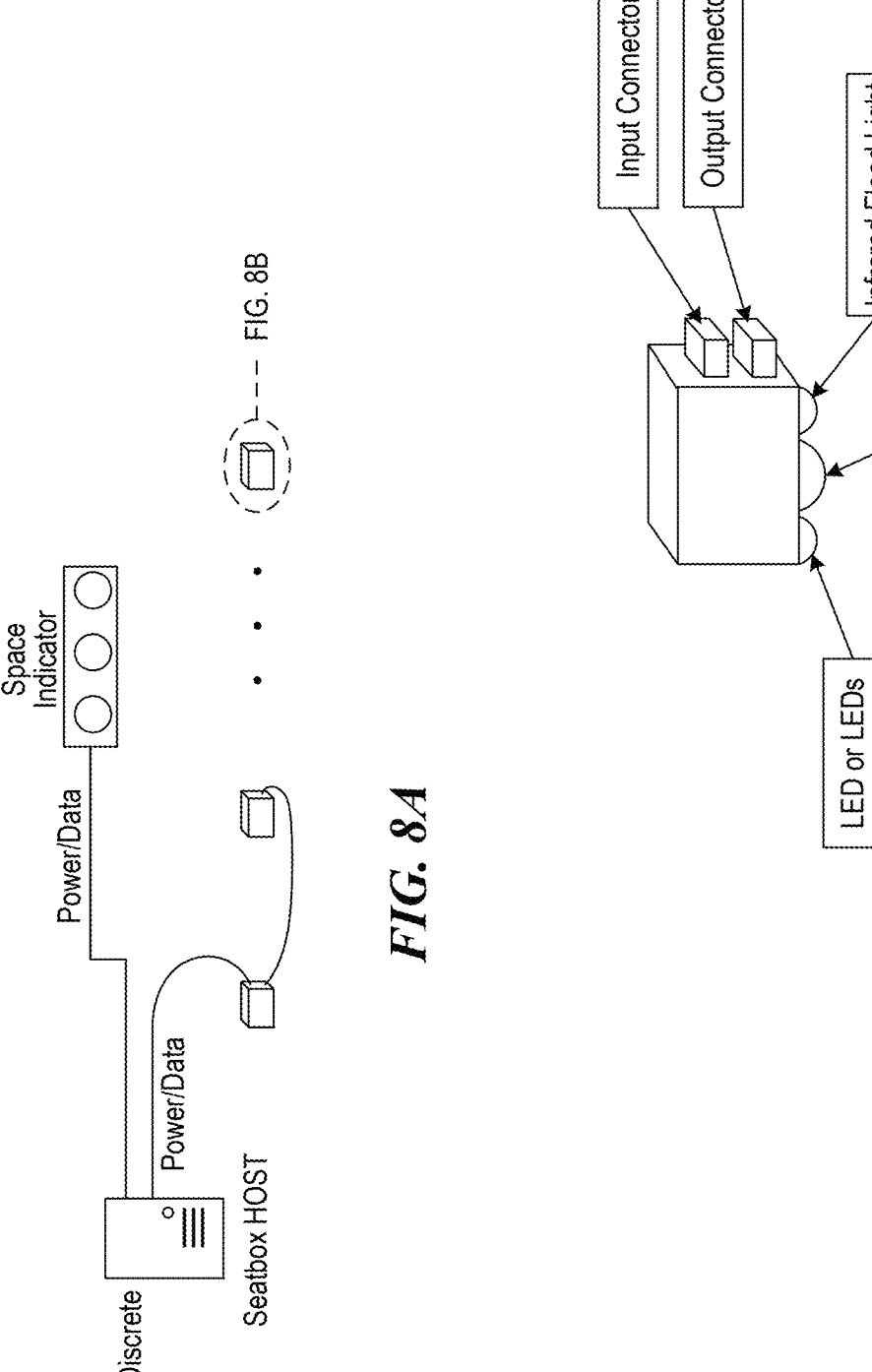
FIGS. 8A and 8B show different components of another example infrared/camera system that reduces the cabling complexity.

FIGS. 8A and 8B show different components of another example infrared/camera system that reduces cabling complexity. FIG. 8A shows the data server and power supply (e.g., the seatbox host), and the smart space indicator, which is communicatively coupled to the data server and the power supply using a single (combined) data and power connector. In some examples, the smart space indicator can be implemented using a single red-green-blue (RGB) LED. In other examples, an LED screen or three different colored LEDs can be used to indicate the status of the smart space indicator. In example implementations, the RGB LED can be controlled via a WS2812B protocol (or a similarly-structured protocol), whereas the LED screen can be controlled via a RS 232/I2C/SPI protocol (or a similarly-structured protocol). In this example, the smart space indicator may be located next to or under the seat number plate. In the described embodiments, the LED is turned on only during the onboarding process, e.g., prior to the cabin crew making last minute safety announcements and take off.

The seatbox host is also connected to each of the camera modules (via a combined power/data physical connection), an example of which is shown in FIG. 8B. As shown therein, the camera module includes an input connector and an output connector, which may be communicatively coupled to one or more line-replaceable units (LRUs) via SPI (e.g., full-duplex communication), Universal Serial Bus (USB), or a Base-T1 Ethernet connector. The camera module further includes a camera lens that continuously (or periodically) monitors the interior of the overhead bin, which enables the amount of available space to be determined.

In this example system, the camera module includes an integrated IR floodlight and an LED strip (or alternatively, one or more LEDs). Using IR light (e.g., from one or more IR LEDs in the integrated IT floodlight) is advantageous because it does not illuminate the cabin and is not visible to the passengers, but enhances the functionality of the camera modules in low-light conditions. The integrated LED strip (which is located within the overhead bin) can be configured to display the same color (as the smart space indicator) by the seatbox host. In the described embodiments, the LED and/or LED strip are turned on only during the onboarding process, e.g., prior to the cabin crew making last minute safety announcements and take off.

Figures 9A, 9B:
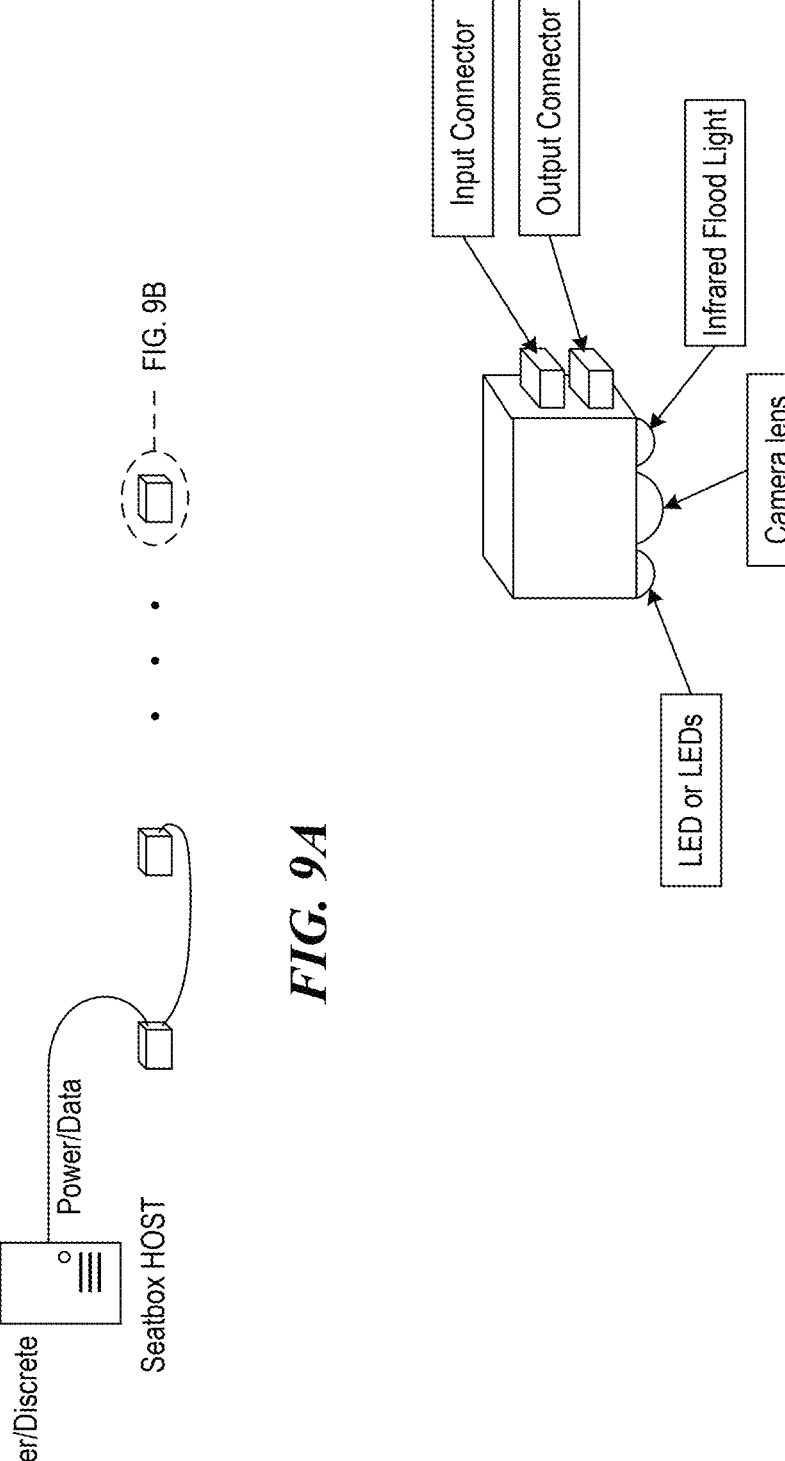
FIGS. 9A and 9B show different components of a low-cost carrier option of the example infrared/camera system shown in FIGS. 8A and 8B.

FIGS. 9A and 9B show different components of a low-cost carrier option of the example infrared/camera system shown in FIGS. 8A and 8B. This example system, as shown in FIG. 9A, excludes the smart space indicator. The camera module shown in FIG. 9B is identical to the camera module described in the context of FIG. 8B. As a result, the LED strip (or alternatively, one or more LEDs) inside the overhead bin provides the only visual indication of the amount of overhead bin space currently being used. Additionally, the color of the LED strip can be communicated to the crew terminals, which will alert crew members of overhead space availability in an adjacent portion of the aircraft.

Figure 10:
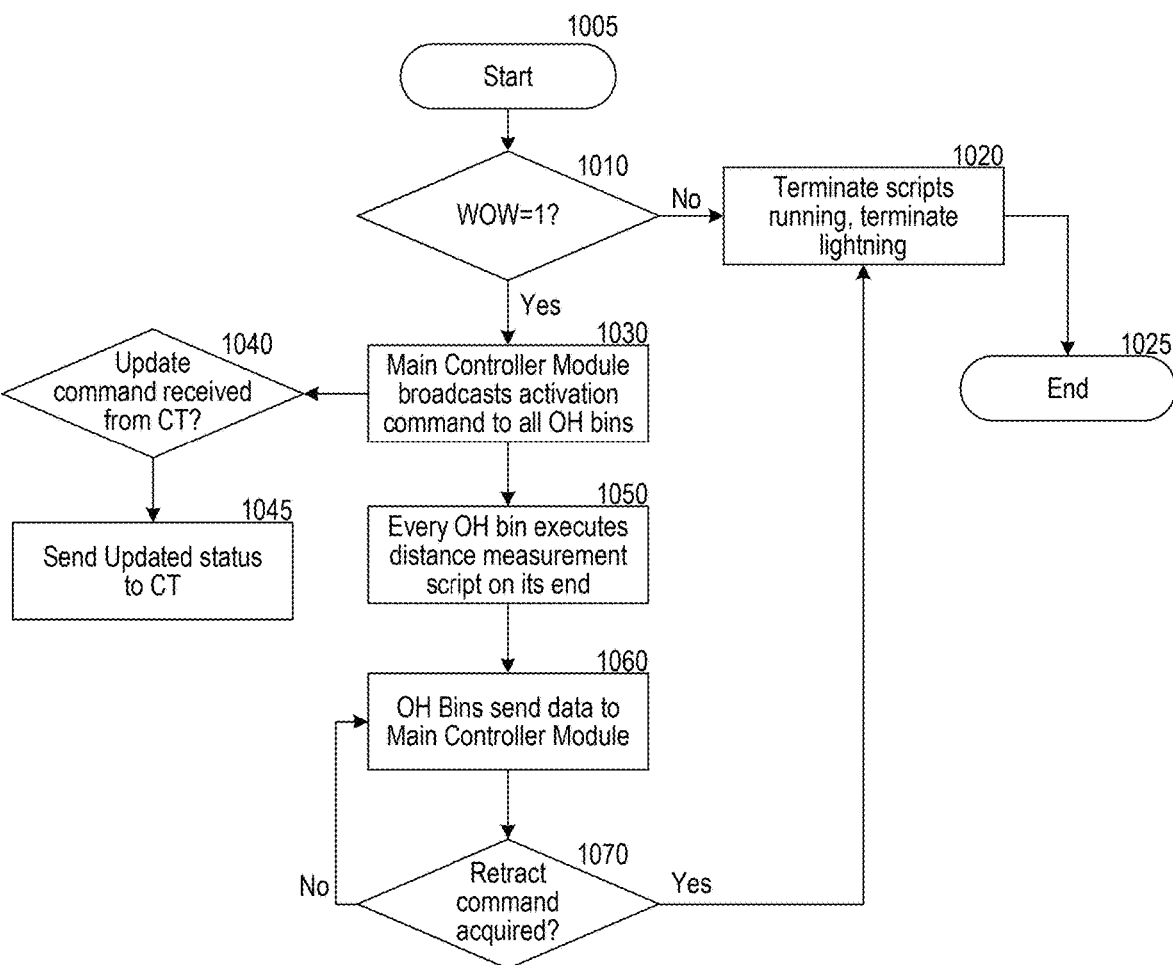
FIG. 10 shows a flowchart for an example method for controlling overhead space indicators for multiple overhead bins in an airplane.

FIG. 10 shows a flowchart for an example method for controlling overhead space indicators for multiple overhead bins in an airplane. As shown therein, the method begins (1005) and proceeds to check an output of one or more weight-on-wheels (WOW) sensors (1010). If the output is "false" (e.g., the plane is not resting on its wheels, and has likely taken off), all scripts and commands related to controlling the smart space indicator are terminated and the LED and/or LED strip is turned off (1020), and the method ends (1025). On the other hand, if the output of the one or more WOW sensors is "true" (e.g., the plane is resting on its wheels, has not taken off, and is the boarding process is likely going on), then the main controller module broadcasts an activation command to all overhead bins (1030). In some examples, the main controller module may be any appropriate LRU in the aircraft. In an example, the LRU is a seatbox that powers the system and receives the overhead space status/indication. In another example, the LRU is a crew terminal using which a flight attendant could review the data from the seatbox.

The activation command from the main controller module results in each overhead bin executing the distance measurement script (1050), and results from each overhead bin are sent to the main controller module (1060). The functionality of the distance measurement script (1050) was overviewed in the context of FIGS. 5A-5C and 7A-7C above, and is further detailed in FIGS. 11-14 below. In conjunction with the overhead bins receiving the activation command and executing the distance measurement script, the main controller module determines whether it has received an update status command from a crew terminal (1040), and provides an updated status to the crew terminal (1045) upon receiving the command.

After the results from each overhead bin are sent to the main controller module (1060), the appropriate color on the LED and/or LED strip may be displayed. If the main controller module receives a retract command, all scripts and commands related to controlling the smart space indicator are terminated and the LED and/or LED strip is turned off (1020), and the method ends (1025). If no retract command is received, the results from the overhead bins continue to be monitored by the main controller module. In some embodiments, the retract command is issued by a crew member from a crew tablet. In other embodiments, the retract command is executed based on other processes being completed, e.g., once the flight crew has started providing the safety instructions to the passengers, the retract command may be automatically issued.

Figure 11:
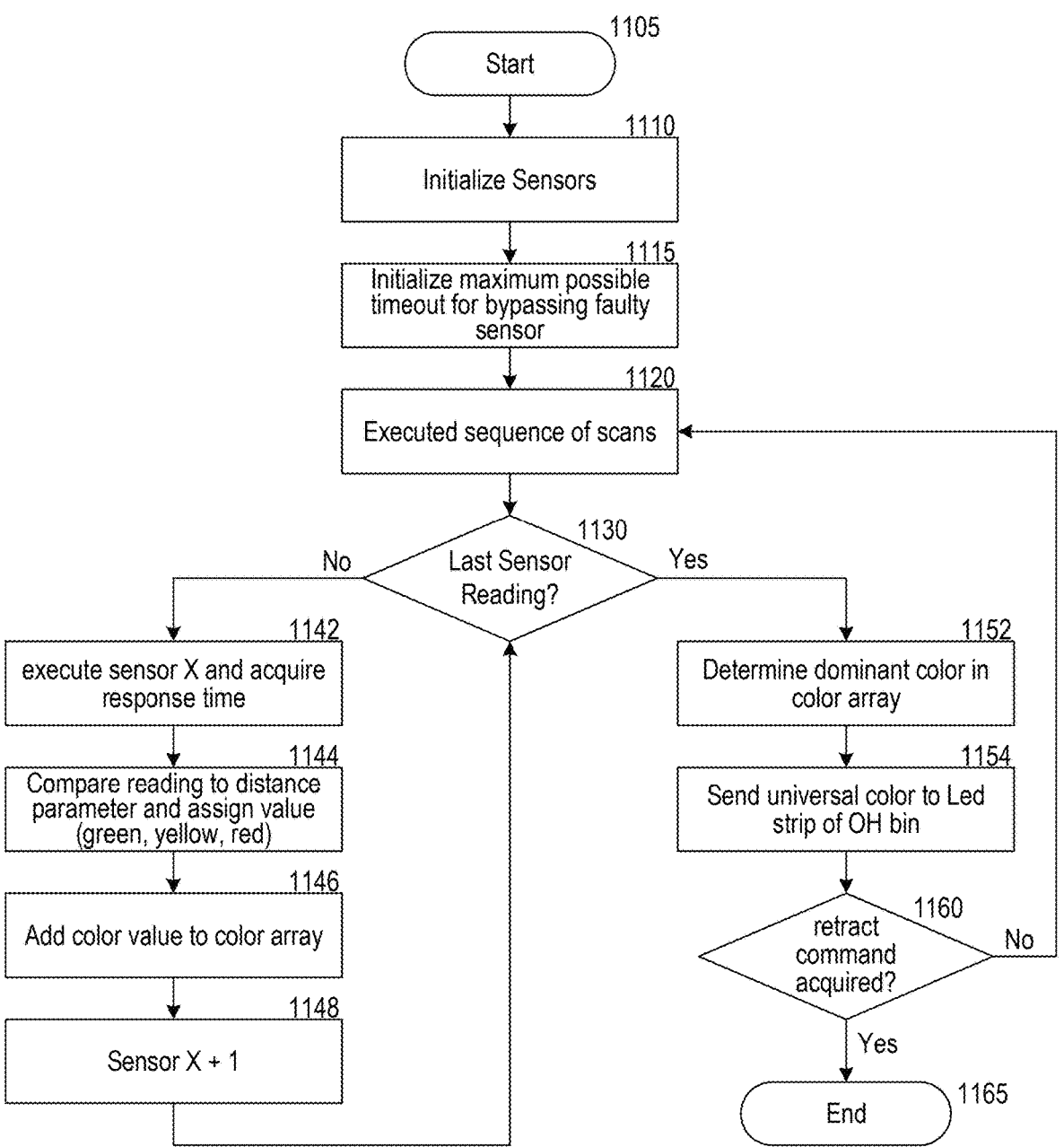
FIG. 11 shows a flowchart for controlling the example sensor/emitter system.

FIG. 11 shows a flowchart for controlling the example sensor/emitter system. The method begins (1105) by initializing the ultrasonic sensors (1110), and initializing the maximum possible timeout for bypassing a faulty sensor (1115). Setting a maximum possible timeout value ensures that a single faulty sensor (e.g., either the emitter or receiver of the ultrasonic sensor) does not cause the system to crash or not display an indication using the LED and/or LED strip. Each of the ultrasonic sensor/emitter modules executes its scanning script (1120), and a main controller module then determines whether it has received data from the last sensor (1130).

An ultrasonic sensor/emitter module executing its scanning script includes transmitting an ultrasonic signal from the emitter, using the receiver to detect a reflection, and acquire a response time or time-of-flight (1142), comparing the reading to a distance parameter to assign a value for space availability for that particular ultrasonic module (1144), adding that value to a color array (1146), and then repeating this process for the next sensor (1148). As discussed previously, the value assigned for space availability could be "green", "yellow", or "red" to indicate that the overhead bin is mostly empty (or empty), half full (or half empty), or nearly completely full, respectively. Alternatively, if the main controller module determines that it has received data from the last sensor (1130), then the dominant color in the array is determined (1152), and that color is sent to the LED and/or LED strip for that overhead bin to be displayed (1154).

If the main controller module receives a retract command (1160), all scripts and commands related to controlling the smart space indicator are terminated and the LED and/or LED strip is turned off, and the method ends (1165). If no retract command is received (1160), the results from the overhead bins continue to be monitored by the main controller module.

Figure 12:
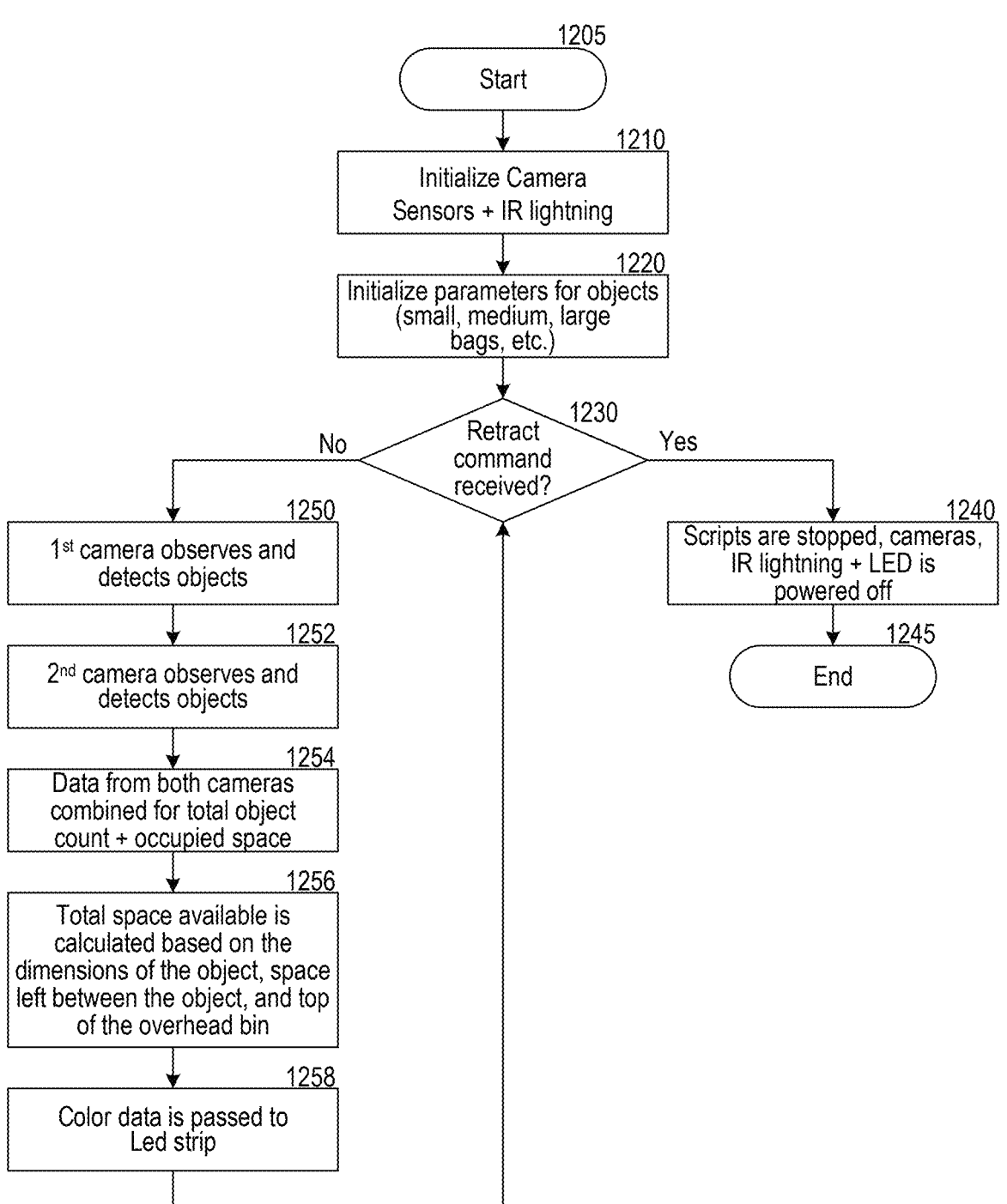
FIG. 12 shows a flowchart for controlling the example infrared/camera system.

FIG. 12 shows a flowchart for controlling the example infrared/camera system. The method begins (1205) by initializing the camera sensors and the IR illumination floodlight (1210), and initializing the parameters that are used to identify small, medium and large pieces of luggage (1220). The main controller module then determines whether a retract command has been received (1230). If it has, all scripts and commands related to controlling the smart space indicator, cameras and IR floodlight are terminated, and the LED and/or LED strip, camera, and IR floodlight are turned off (1240), and the method ends (1245).

If a retract command has not been received, a first camera observes the overhead bin interior and detects any luggage therein (1250), and is followed by the second camera observing the overhead bin interior and detecting any luggage therein (1252). In some embodiments, any number of cameras may be used in a single overhead bin such that their combined field-of-views span the entire interior of the overhead bin. In an example, an overhead bin measuring 1.6 m×0.4 m×0.3 m (or 62"×16"×12") uses two cameras to span the entire interior. More generally, the size of an overhead bin is based on the airframe and airline customization, and the described embodiments can be scaled to ensure the appropriate number of cameras can be installed so that their combined field-of-views span the entire interior of the overhead bin.

Data from both (or multiple) cameras is combined to determine the total number of objects in the overhead bin and the occupied space (1254). Then, the total available space is calculated based on the dimensions of the pieces of luggage in the overhead bin, the space left between objects, and the top of the overhead bin (1256). Based on the total available space, a color for the smart space indicator is determined, and sent to the LED and/or LED strip (1258).

In some embodiments, the runtime initialization and termination of the described methods (e.g., controlling overhead space indicators for multiple overhead bins, as shown in FIG. 10; controlling the sensor-emitter system, as shown in FIG. 11; and controlling the infrared-camera system, as shown in FIG. 12) are based on specified flight transient data parameters and conditions being met on the headend. For example, the headend can trigger the start (e.g., 1005 in FIG. 10, 1105 in FIG. 11, and 1205 in FIG. 12) of the described methods, or trigger their completion or shutdown (e.g., send the "retract command" to be evaluated by decision box 1070 in FIG. 10, 1160 in FIG. 11, and 1230 in FIG. 12), based on values of particular parameters or certain conditions being met. Additionally, or alternatively, the runtime initialization and termination of the described methods may be controlled using a crew terminal.

Figure 13:
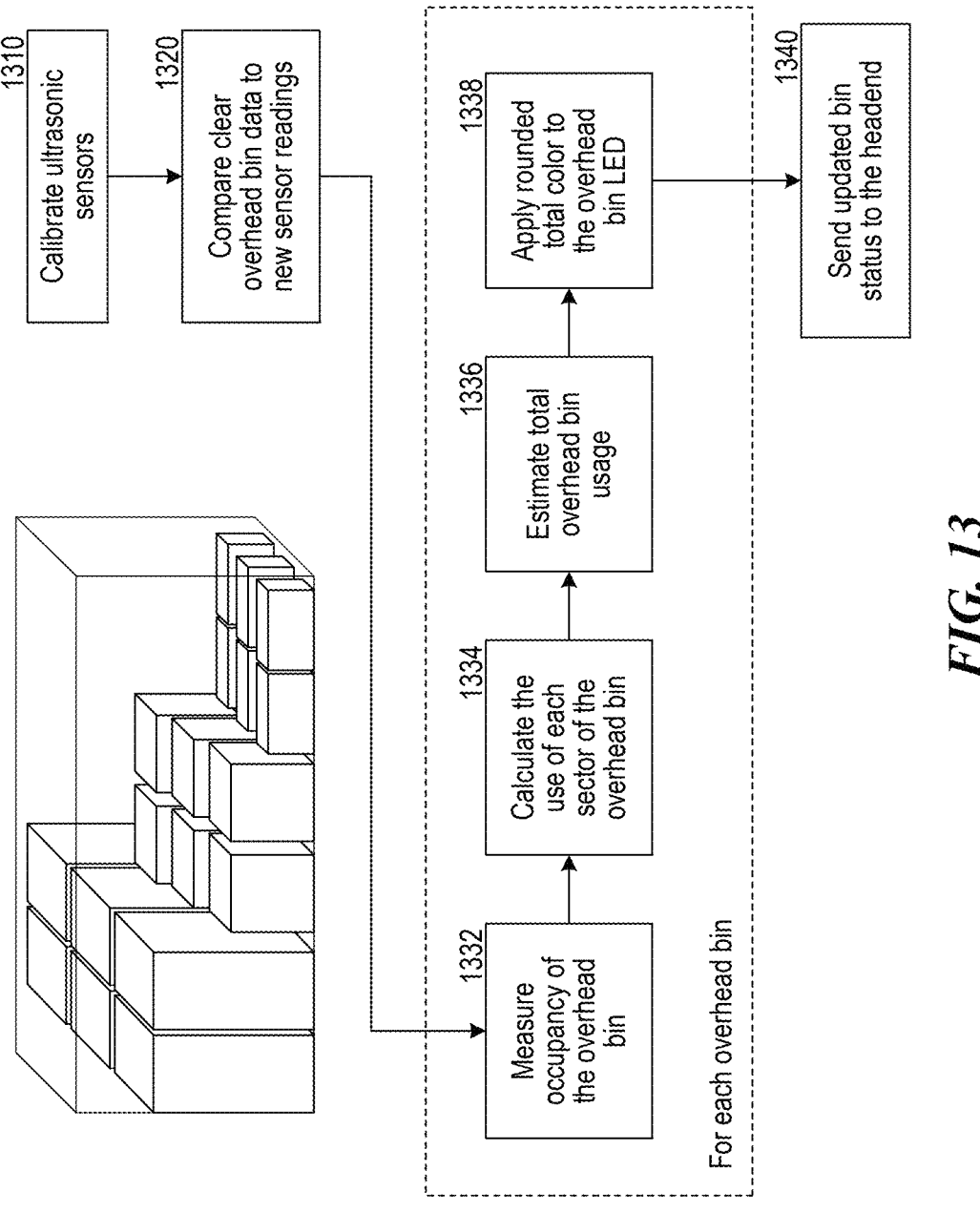
FIG. 13 shows a flow diagram for using the example sensor/emitter system.

FIG. 13 shows a flow diagram for using the example sensor/emitter system. As shown therein, the method begins with calibrating the ultrasonic sensors (1310), and comparing the clear (or empty) overhead bin data to the new sensor readings. For each overhead bin, the occupancy of the overhead bin is measured (1332), the use of each sector of the overhead bin, e.g., the volume nearest to, or corresponding to, each ultrasonic module, is calculated (1334). In some examples, the ultrasonic module uses its emitter to emit an ultrasonic signal, receives a reflection of the ultrasonic signal, and based on the response time (or equivalently, the time-of-flight), assigns a sector use, e.g., full, partially full, or low, as shown in the top left of FIG. 13.

The method then determines the total overhead bin usage (1336). In some examples, this can be calculated by assigning a value for each sector use, e.g., "2" for full, "1" for partially full, and "0" for relatively empty (or empty), and then computing an average value as the total overhead bin usage. The rounded average value is used to determine the color for that overhead bin (1338), and the updated bin status is send to the headend or crew terminal (1340), in addition to the LED and/or LED strip, where it is displayed.

Figure 14:
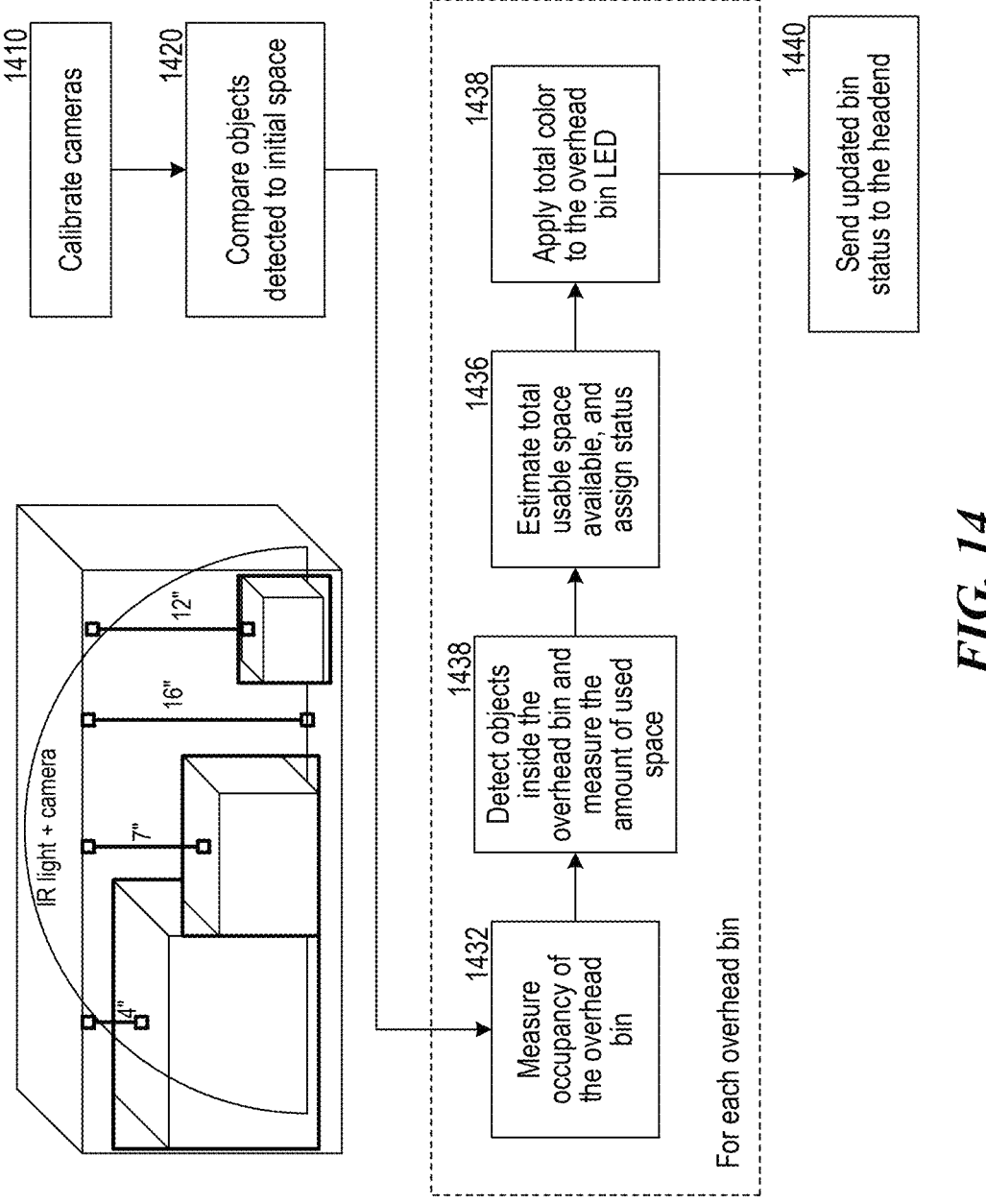
FIG. 14 shows a flow diagram for using the example infrared/camera system.

FIG. 14 shows a flow diagram for using the example infrared/camera system. As shown therein, the method begins with calibrating the cameras (1410), and comparing the objects detected to the initial space (1420). For each overhead bin, the occupancy of the overhead bin is measured (1432) by detecting the objects inside the overhead bin and measuring the amount of used space (1434). In an example, this is achieved (as shown in the top left of FIG. 14) by measuring the distance between the top of the overhead bin and the top of each piece of luggage. This enables the total usable (and available) space to be determined and a status for the overhead bin (1436). In an example, the status assigned could be "full," "partially full" or "empty." Based on the assigned status, the color for the overhead bin is determined and sent to the corresponding LED and/or LED strip for that overhead bin (1438). The method concludes with sending the updated bin status to the headend or crew terminal (1440).

FIG. 15 shows a flowchart of an example method 1500 of providing space availability indications for an overhead bin in an aircraft based on some implementations of the disclosed technology. The method 1500 includes, at operation 1510, initializing each of a plurality of sensors that span an interior space of an overhead bin. In an example, each of the plurality of sensors comprises a receiver, and the signals into receivers of the plurality of sensors span an interior space of the overhead bin when the overhead bin is empty.

The method 1500 includes, at operation 1520, using a receiver in each of the plurality of sensors to acquire a signal.

The method 1500 includes, at operation 1530, determining, based on the signals, a parameter indicative of an amount of empty space corresponding to a respective sensor of the plurality of sensors.

The method 1500 includes, at operation 1540, determining an overhead bin visual indicator by selecting, based on the parameter from each of the plurality of sensors, a visual indicator from a plurality of visual indicators. In some embodiments, a first visual indicator of the plurality of visual indicators is indicative of the overhead bin being empty, and a last visual indicator of the plurality of visual indicators is indicative of the overhead bin having no more space for additional luggage.

The method 1500 includes, at operation 1550, displaying, using a light-emitting means, the overhead bin visual indicator.

Various techniques preferably incorporated within some embodiments may be described using the following solution-based format.

A1. A method for providing a space availability indication for an overhead bin in an aircraft, the method comprising initializing one or more system parameters and each of a plurality of ultrasonic sensors, wherein each ultrasonic sensor comprises an emitter and a receiver, and wherein signals from emitters of the plurality of ultrasonic sensors span an interior space of the overhead bin; for each of the plurality of ultrasonic sensors, using the emitter to transmit an ultrasonic signal, using the receiver to acquire a reflection of the ultrasonic signal, determining, based on a time of flight computed using the reflection, a distance parameter indicative of an amount of empty space adjacent to a corresponding sensor, assigning, based on the distance parameter, exactly one of a first color indicative of the overhead bin being empty, a second color indicative of the overhead bin being partially full, or a third color indicative of the overhead bin having no more space for additional luggage to a sensor indicator color, and adding the sensor indicator color to a sensor color array; determining, based on a result of a consensus algorithm applied to the sensor color array, an overhead bin indicator color; and displaying, using a light-emitting means, the overhead bin indicator color.

A2. The method of solution A1, wherein the one or more system parameters comprises a maximum possible timeout for bypassing a faulty sensor.

A3. The method of solution A1, wherein the light-emitting means includes a single red-green-blue (RGB) light-emitting diode (LED), three different colored LEDs, an LED strip, or a liquid crystal display (LCD) screen.

A4. The method of solution A1, further comprising transmitting the overhead bin indicator color to a crew tablet, wherein the crew tablet is configured to simultaneously display the overhead bin indicator color for each overhead bin in the aircraft.

A5. The method of solution A1, wherein the one or more system parameters and each of the plurality of ultrasonic sensors is initialized prior to an onboarding process for the aircraft, and wherein the method further comprises receiving, subsequent to the onboarding process, an instruction from a crew tablet; and turning off, based on the instruction, each of the plurality of ultrasonic sensors and the light-emitting means.

A6. The method of solution A1, wherein the light-emitting means displaying the overhead bin indicator color in a blinking pattern for the overhead bin and at least one different overhead bin is indicative of luggage being rearrangeable between the overhead bin and the at least one different overhead bin.

A7. The method of solution A6, wherein the at least one different overhead bin is (a) adjacent to the overhead bin or (b) one overhead bin over from the overhead bin.

A8. A method for providing a space availability indication for an overhead bin in an aircraft, the method comprising initializing an infrared lighting unit and each of a plurality of cameras such that an overlap of a field-of-view of each camera spans an interior space of the overhead bin; turning on the infrared lighting unit; capturing, for each of the plurality of cameras, an image of the field-of-view for a respective camera; generating a composite image of the interior space of the overhead bin by combining the image from each of the plurality of cameras; determining, based on the composite image, an estimate of an amount of empty space in the interior space of the overhead bin; determining an overhead bin indicator color by assigning, based on the estimate, exactly one of a first color indicative of the overhead bin being empty, a second color indicative of the overhead bin being partially full, or a third color indicative of the overhead bin having no more space for additional luggage to the overhead bin indicator color; and displaying, using a light-emitting means, the overhead bin indicator color.

A9. The method of solution A8, wherein the light-emitting means includes a single red-green-blue (RGB) light-emitting diode (LED), three different colored LEDs, an LED strip, or a liquid crystal display (LCD) screen.

A10. The method of solution A8, further comprising transmitting the overhead bin indicator color to a crew tablet, wherein the crew tablet is configured to simultaneously display the overhead bin indicator color for each overhead bin in the aircraft.

A11. The method of solution A8, wherein the infrared lighting unit and each of the plurality of cameras is initialized prior to an onboarding process for the aircraft, and wherein the method further comprises receiving, subsequent to the onboarding process, an instruction from a crew tablet; and turning off, based on the instruction, power to each of the plurality of cameras, the infrared lighting unit, and the light-emitting means.

A12. The method of solution A8, wherein determining the estimate of the amount of empty space in the interior space of the overhead bin comprises for each piece of luggage in the overhead bin, determining, based on the composite image, a center point of an upper surface of a corresponding piece of luggage; and determining a shortest distance between the center point and a ceiling of the overhead bin, and wherein determining the overhead bin indicator color is based on the shortest distance for each piece of luggage in the overhead bin.

A13. The method of solution A8, wherein the infrared lighting unit comprises a cylindrical housing, wherein a diameter of the cylindrical housing is at least twice as long as a thickness of the cylindrical housing; and a plurality of infrared emitters symmetrically positioned on a lower surface of the cylindrical housing.

A14. A system for providing space availability indications for an overhead bin in an aircraft, comprising a plurality of sensors configured to enable detection of one or more distances within the overhead bin, wherein each of the plurality of sensors comprises an emitter and a receiver, and wherein signals from emitters of the plurality of sensors span an interior space of the overhead bin; a light-emitting means configured to display a first color indicative of the overhead bin being empty, a second color indicative of the overhead bin being partially full, or a third color indicative of the overhead bin having no more space for additional luggage, wherein the light-emitting means are located adjacent to a seat number plate associated with the overhead bin; a power supply coupled to the plurality of sensors and the light-emitting means; and at least one processor configured to determine, based on the one or more distances, a usable amount of space that is not occupied by luggage within the interior space of the overhead bin, select, based on the usable amount of space, an overhead bin indicator color corresponding to exactly one of the first color, the second color, or the third color, display the overhead bin indicator color using the light-emitting means, and transmit the overhead bin indicator color for the overhead bin to a server.

A15. The system of solution A14, wherein the light-emitting means includes a single red-green-blue (RGB) light-emitting diode (LED), three different colored LEDs, an LED strip, or a liquid crystal display (LCD) screen.

A16. The system of solution A14, wherein the plurality of sensors comprises a plurality of ultrasonic sensors arranged in a matrix configuration within the interior space of the overhead bin.

A17. The system of solution A14, wherein the plurality of sensors comprises two or more cameras, and wherein the system further comprises an infrared lighting unit comprising a plurality of infrared emitters.

A18. The system of solution A14, wherein the at least one processor is further configured to calibrate, prior to determining the usable amount of space, the plurality of sensors.

A19. The system of solution A14, wherein each of the plurality of sensors is initialized prior to an onboarding process for the aircraft, and wherein the at least one processor is further configured to receive, subsequent to the onboarding process, an instruction; and turn off, based on the instruction, power to the light-emitting means and each of the plurality of sensors.

A20. The system of solution A14, further comprising a crew tablet configured to simultaneously display the overhead bin indicator color for each overhead bin in the aircraft.

B1. A method of providing space availability indications for an overhead bin in an aircraft, comprising initializing each of a plurality of sensors, wherein each of the plurality of sensors comprises a receiver, and wherein signals into receivers of the plurality of sensors span an interior space of the overhead bin when the overhead bin is empty; for each of the plurality of sensors, using the receiver to acquire a signal, and determining, based on the signal, a parameter indicative of an amount of empty space corresponding to a respective sensor of the plurality of sensors, wherein determining an overhead bin visual indicator comprises selecting, based on the parameter from each of the plurality of sensors, a visual indicator from a plurality of visual indicators, wherein each of the plurality of visual indicators is indicative of a different available capacity of the overhead bin, wherein a first visual indicator of the plurality of visual indicators is indicative of the overhead bin being empty, wherein a last visual indicator of the plurality of visual indicators is indicative of the overhead bin having no more space for additional luggage; and displaying, using a light-emitting means, the overhead bin visual indicator.

B2. The method of solution B1, wherein the plurality of sensors comprises a plurality of ultrasonic sensors, wherein the signal is a reflection of an ultrasonic signal emitted by the respective sensor, and wherein the parameter comprises a time of flight of the reflection.

B3. The method of solution B2, wherein selecting the visual indicator comprises estimating the amount of empty space in the interior space of the overhead bin when the overhead bin includes at least one piece of luggage.

B4. The method of solution B3, wherein estimating the amount of empty space comprises for each of the at least one piece of luggage in the overhead bin, determining, based on the time of flight, a quantized occupancy value for a space in the overhead bin adjacent to a respective ultrasonic sensor, wherein determining the overhead bin visual indicator is based on the quantized occupancy value for each of the plurality of ultrasonic sensors.

B5. The method of solution B2, wherein using the receiver to acquire the signal is based on a maximum possible timeout for bypassing a faulty sensor.

B6. The method of solution B1, wherein each of the plurality of sensors comprises a camera, wherein initializing the camera comprises adjusting the camera such that an overlap of a field-of-view of each camera spans the interior space of the overhead bin, and wherein the method further comprises initializing an infrared lighting unit, wherein the signal is a reflection of a signal emitted by the infrared lighting unit and corresponds to an image of the field-of-view for a respective camera, and wherein the parameter comprises a composite image of the interior space of the overhead bin generated by combining images from each camera.

B7. The method of solution B6, wherein selecting the visual indicator comprises estimating the amount of empty space in the interior space of the overhead bin when the overhead bin includes at least one piece of luggage.

B8. The method of solution B7, wherein estimating the amount of empty space comprises for each of the at least one piece of luggage in the overhead bin, determining, based on the composite image, a center point of an upper surface of a corresponding piece of luggage; and determining a shortest distance between the center point and a ceiling of the overhead bin, and wherein determining the overhead bin visual indicator is based on the shortest distance for each of the at least one piece of luggage in the overhead bin.

B9. The method of solution B6, wherein the infrared lighting unit comprises a cylindrical housing, wherein a diameter of the cylindrical housing is at least twice as long as a thickness of the cylindrical housing; and a plurality of infrared emitters symmetrically positioned on a lower surface of the cylindrical housing.

B10. The method of solution B1, further comprising transmitting the overhead bin visual indicator to a crew tablet, wherein the crew tablet is configured to simultaneously display the overhead bin visual indicator for each overhead bin in the aircraft.

B11. The method of solution B1, wherein the light-emitting means displaying the overhead bin visual indicator in a blinking pattern for the overhead bin and at least one different overhead bin is indicative of luggage being rearrangeable between the overhead bin and the at least one different overhead bin.

B12. The method of solution B11, wherein the at least one different overhead bin is (a) adjacent to the overhead bin or (b) one overhead bin over from the overhead bin.

B13. A system for providing space availability indications for an overhead bin in an aircraft, comprising a plurality of sensors configured to enable detection of a parameter indicative of a usable amount of space within the overhead bin, wherein each of the plurality of sensors comprises a receiver, and wherein signals into receivers of the plurality of sensors span an interior space of the overhead bin; a light-emitting means configured to display a plurality of visual indicators, wherein each of the plurality of visual indicators is indicative of a different available capacity of the overhead bin, wherein a first visual indicator of the plurality of visual indicators is indicative of the overhead bin being empty, wherein a last visual indicator of the plurality of visual indicators is indicative of the overhead bin having no more space for additional luggage, and wherein the light-emitting means is located adjacent to a seat number plate associated with the overhead bin; a power supply coupled to the plurality of sensors and the light-emitting means; and at least one processor configured to select, based on the parameter, an overhead bin visual indicator from the plurality of visual indicators, display the overhead bin visual indicator using the light-emitting means, and transmit the overhead bin visual indicator for the overhead bin to an on-board server and/or a crew tablet.

B14. The system of solution B13, wherein the light-emitting means includes a single red-green-blue (RGB) light-emitting diode (LED), a single multiple-color LED, three different colored LEDs, multiple different colored LEDs, an LED strip, or a liquid crystal display (LCD) screen.

B15. The system of solution B13, wherein the plurality of sensors comprises a plurality of ultrasonic sensors arranged in a matrix configuration within the interior space of the overhead bin.

B16. The system of solution B13, wherein the plurality of sensors comprises two or more cameras, and wherein the system further comprises an infrared lighting unit comprising a plurality of infrared emitters.

B17. The system of solution B13, wherein the at least one processor is further configured to calibrate, prior to determining the usable amount of space, the plurality of sensors.

B18. The system of solution B13, wherein each of the plurality of sensors is initialized prior to an onboarding process for the aircraft, and wherein the at least one processor is further configured to receive, subsequent to the onboarding process, an instruction; and turn off, based on the instruction, power to the light-emitting means and each of the plurality of sensors.

B19. The system of solution B13, wherein the plurality of visual indicators comprises visual indicators of different colors that are repeated a different number of times, or a logo replicated a different number of times.

B20. An apparatus for providing space availability indications for an overhead bin in an aircraft, comprising at least one processor configured to initialize each of a plurality of sensors, wherein each of the plurality of sensors comprises a receiver, and wherein signals into receivers of the plurality of sensors span an interior space of the overhead bin when the overhead bin is empty; for each of the plurality of sensors, use the receiver to acquire a signal, and determine, based on the signal, a parameter indicative of an amount of empty space corresponding to a respective sensor of the plurality of sensors, wherein determining an overhead bin visual indicator comprises selecting, based on the parameter from each of the plurality of sensors, a visual indicator from a plurality of visual indicators, wherein each of the plurality of visual indicators is indicative of a different available capacity of the overhead bin, wherein a first visual indicator of the plurality of visual indicators is indicative of the overhead bin being empty, wherein a last visual indicator of the plurality of visual indicators is indicative of the overhead bin having no more space for additional luggage; and display, using a light-emitting means, the overhead bin visual indicator.

Figure 16:
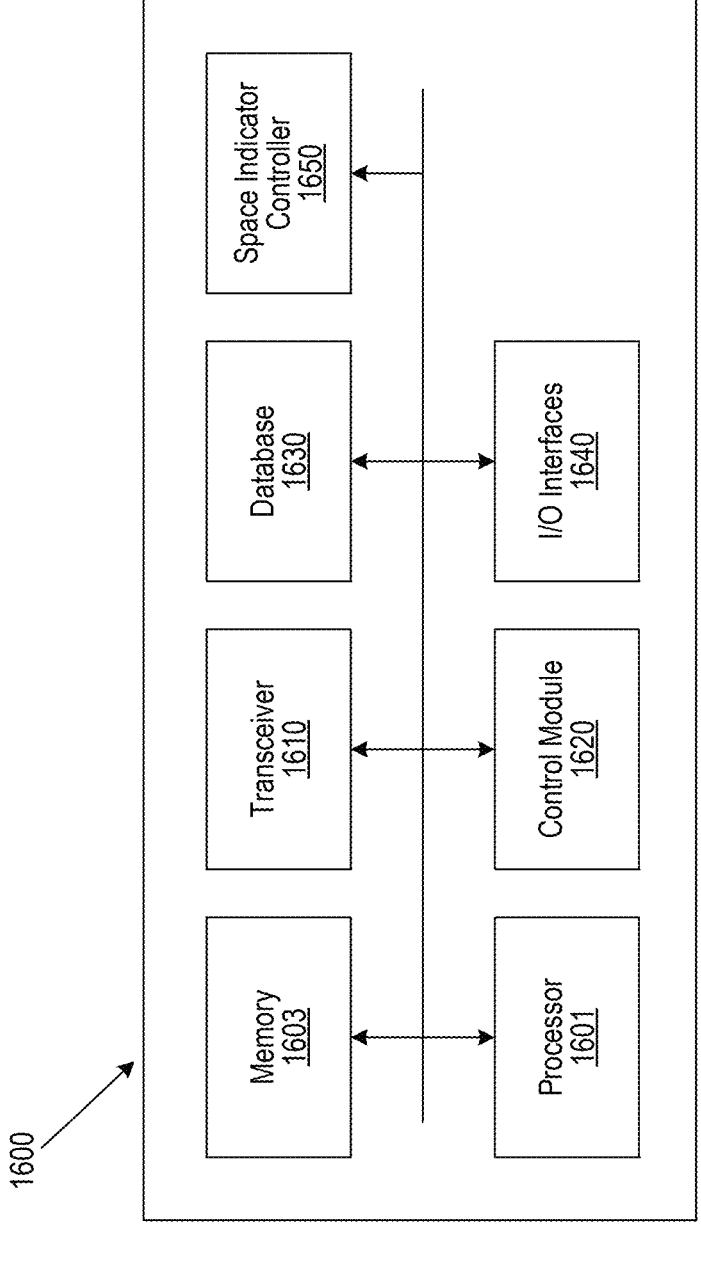
FIG. 16 shows a block diagram of an example computing device based on some implementations of the disclosed technology.

FIG. 16 shows an example block diagram of a computing device (e.g., an onboard server, a media playback device, a PED, or a cabin crew tablet) based on some implementations of the disclosed technology. The computing device 1600 includes at least one processor 1601, a memory 1603, a transceiver 1610, a control module 1620 (e.g., the main controller module described in FIG. 10), a database 1630, an input/output (I/O) interface 1640, and space indicator controller 1650. In other embodiments, additional, fewer, and/or different elements may be used to configure the computing device 1600. The memory 1603 may store instructions and applications to be executed by the processor 1601. The memory 1603 is an electronic holding place or storage for information or instructions so that the information or instructions can be accessed by the processor 1601. The memory 1603 can include, but is not limited to, any type of random-access memory (RAM), any type of read only memory (ROM), any type of flash memory, such as magnetic storage devices (e.g., hard disk, floppy disk, magnetic strips, etc.), optical disks (e.g., compact disc (CD), digital versatile discs (DVD), etc.), smart cards, flash memory devices, etc. The instructions upon execution by the processor 1601 configure the computing device 1600 to perform the operations (e.g., the operations as shown in FIGS. 13-15). The instructions executed by the processor 1601 may be carried out by a special purpose computer, logic circuits, or hardware circuits. The processor 1601 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 1601 can perform the operations called for by that instruction.

The processor 1601 operably couples with the memory 1603, the transceiver 1610, the control module 1620, the database 1630, and the I/O interface 1640, to receive, send, and process information and to control the operations of the computing device 1600. The processor 1601 may retrieve a set of instructions from a permanent memory device, such as a ROM device, and copy the instructions in an executable form to a temporary memory device that is generally some form of RAM. In some implementations, the computing device 1600 can include a plurality of processors that use the same or a different processing technology. The transceiver 1610 may include a transmitter and a receiver. In some embodiments, the computing device 1600 comprises a transmitter and a receiver that are separate from another but functionally form a transceiver. The transceiver 1610 transmits or sends information or data to another device (e.g., another server, a PED, etc.) and receives information or data transmitted or sent by another device (e.g., another server, a PED, etc.).

The control module 1620 of the computing device 1600 is configured to perform operations to assist the computing device 1600. In some implementations, the control module 1620 can be configured as a part of the processor 1601. In an example, the control module 1620 can operate in conjunction with the space indicator controller 1650 to determine any overhead bins still have empty space, and inform the cabin crew so they can assist the passengers. In another example, the control module 1620 is configured to determine, based on feedback from the space indicator controller 1650, whether there are overhead bins with luggage that can be rearranged. In some implementations, the control module 1620 can operate machine learning and/or artificial intelligence (AI) applications that perform various types of data analysis to determine optimal placements for fixed overhead bin storage, e.g., safety equipment, and similar operations. Using algorithms that iteratively learn from data, machine learning applications can enable computers to learn without being explicitly programmed. The machine learning/AI applications may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. In some implementations, the control module 1620 may assist the computing device 1600 to perceive their environment and take actions that maximize the effectiveness of the operations performed by the computing device 1600.

The I/O interfaces 1640 enable data to be provided to the computing device 1600 as input and enable the computing device 1600 to provide data as output. In some embodiments, the I/O interfaces 1640 may enable user input to be obtained and received by the computing device 1600 (e.g., via a touch-screen display, buttons, switches) and may enable the computing device 1600 to display information. In some embodiments, devices, including touch screen displays, buttons, controllers, audio speakers, or others, are connected to the computing device 1600 via I/O interfaces 1640.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware, or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this patent document.

What is claimed is:

1. A method of providing space availability indications for an overhead bin in an aircraft, comprising:

initializing each of a plurality of sensors, wherein each of the plurality of sensors comprises a camera, wherein signals into cameras of the plurality of sensors span an interior space of the overhead bin when the overhead bin is empty, and wherein initializing the camera comprises adjusting the camera such that an overlap of a field-of-view of each camera spans the interior space of the overhead bin;

initializing an infrared lighting unit;

for each of the plurality of sensors, using the camera to acquire a signal that comprises a reflection of an infrared signal emitted by the infrared lighting unit and corresponds to an image of the field-of-view for a respective camera, and determining, based on the signal, a parameter indicative of an amount of empty space corresponding to a respective sensor of the plurality of sensors, wherein the parameter comprises a composite image of the interior space of the overhead bin generated by combining images from each camera, wherein determining an overhead bin visual indicator comprises selecting, based on the parameter from each of the plurality of sensors, a visual indicator from a plurality of visual indicators, wherein each of the plurality of visual indicators is indicative of a different available capacity of the overhead bin, wherein a first visual indicator of the plurality of visual indicators is indicative of the overhead bin being empty, wherein a last visual indicator of the plurality of visual indicators is indicative of the overhead bin having no more space for additional luggage; and displaying, using a light-emitting means, the overhead bin visual indicator.

2. The method of claim 1, wherein selecting the visual indicator comprises estimating the amount of empty space in the interior space of the overhead bin when the overhead bin includes at least one piece of luggage.

3. The method of claim 2, wherein estimating the amount of empty space comprises:

for each of the at least one piece of luggage in the overhead bin, determining, based on the composite image, a center point of an upper surface of a corresponding piece of luggage; and determining a shortest distance between the center point and a ceiling of the overhead bin, and wherein determining the overhead bin visual indicator is based on the shortest distance for each of the at least one piece of luggage in the overhead bin.

4. The method of claim 1, wherein the infrared lighting unit comprises:

a cylindrical housing, wherein a diameter of the cylindrical housing is at least twice as long as a thickness of the cylindrical housing; and a plurality of infrared emitters symmetrically positioned on a lower surface of the cylindrical housing.

5. The method of claim 1, further comprising:

transmitting the overhead bin visual indicator to a crew tablet, wherein the crew tablet is configured to simultaneously display the overhead bin visual indicator for each overhead bin in the aircraft.

6. The method of claim 1, wherein the light-emitting means displaying the overhead bin visual indicator in a blinking pattern for the overhead bin and at least one different overhead bin is indicative of luggage being rearrangeable between the overhead bin and the at least one different overhead bin.

7. The method of claim 6, wherein the at least one different overhead bin is (a) adjacent to the overhead bin or (b) one overhead bin over from the overhead bin.

8. A system for providing space availability indications for an overhead bin in an aircraft, comprising:

a plurality of sensors configured to enable detection of a parameter indicative of a usable amount of space within the overhead bin, wherein the plurality of sensors comprise two or more cameras, and wherein signals into the two or more cameras of the plurality of sensors span an interior space of the overhead bin;

an infrared lighting unit comprising a plurality of infrared emitters;

a light-emitting means configured to display a plurality of visual indicators, wherein each of the plurality of visual indicators is indicative of a different available capacity of the overhead bin, wherein a first visual indicator of the plurality of visual indicators is indicative of the overhead bin being empty, wherein a last visual indicator of the plurality of visual indicators is indicative of the overhead bin having no more space for additional luggage, and wherein the light-emitting means is located adjacent to a seat number plate associated with the overhead bin;

a power supply coupled to the plurality of sensors and the light-emitting means; and at least one processor configured to:

initialize each of the plurality of sensors by adjusting its camera such that an overlap of a field-of-view of each camera spans the interior space of the overhead bin;

initialize the infrared lighting unit;

use each camera to acquire a signal that comprises a reflection of an infrared signal emitted by the infrared lighting unit and corresponds to an image of the field-of-view for a respective camera;

determine, based on the signal, the parameter comprising a composite image of the interior space of the overhead bin generated by combining images from each camera;

select, based on the parameter, an overhead bin visual indicator from the plurality of visual indicators, display the overhead bin visual indicator using the light-emitting means, and transmit the overhead bin visual indicator for the overhead bin to an on-board server and/or a crew tablet.

9. The system of claim 8, wherein the light-emitting means includes a single red-green-blue (RGB) light-emitting diode (LED), a single multiple-color LED, three different colored LEDs, multiple different colored LEDs, an LED strip, or a liquid crystal display (LCD) screen.

10. The system of claim 8, wherein the at least one processor is further configured to:

calibrate, prior to determining the usable amount of space, the plurality of sensors.

11. The system of claim 8, wherein each of the plurality of sensors is initialized prior to an onboarding process for the aircraft, and wherein the at least one processor is further configured to:

receive, subsequent to the onboarding process, an instruction; and turn off, based on the instruction, power to the light-emitting means and each of the plurality of sensors.

12. The system of claim 8, wherein the plurality of visual indicators comprises:

visual indicators of different colors that are repeated a different number of times, or a logo replicated a different number of times.

13. An apparatus for providing space availability indications for an overhead bin in an aircraft, comprising:

at least one processor configured to:

initialize each of a plurality of sensors, wherein each of the plurality of sensors comprises a camera, wherein signals into receivers of the plurality of sensors span an interior space of the overhead bin when the overhead bin is empty, and wherein initializing the camera comprises adjusting the camera such that an overlap of a field-of-view of each camera spans the interior space of the overhead bin; and initialize an infrared lighting unit;

for each of the plurality of sensors, use the camera to acquire a signal that comprises a reflection of an infrared signal emitted by the infrared lighting unit and corresponds to an image of the field-of-view for a respective camera, and determine, based on the signal, a parameter indicative of an amount of empty space corresponding to a respective sensor of the plurality of sensors, wherein the parameter comprises a composite image of the interior space of the overhead bin generated by combining images from each camera, wherein determining an overhead bin visual indicator comprises selecting, based on the parameter from each of the plurality of sensors, a visual indicator from a plurality of visual indicators, wherein each of the plurality of visual indicators is indicative of a different available capacity of the overhead bin, wherein a first visual indicator of the plurality of visual indicators is indicative of the overhead bin being empty, wherein a last visual indicator of the plurality of visual indicators is indicative of the overhead bin having no more space for additional luggage; and display, using a light-emitting means, the overhead bin visual indicator.

14. The apparatus of claim 13, wherein selecting the visual indicator comprises estimating the amount of empty space in the interior space of the overhead bin when the overhead bin includes at least one piece of luggage.

15. The apparatus of claim 14, wherein estimating the amount of empty space comprises:

for each of the at least one piece of luggage in the overhead bin, determining, based on the composite image, a center point of an upper surface of a corresponding piece of luggage; and determining a shortest distance between the center point and a ceiling of the overhead bin, and wherein determining the overhead bin visual indicator is based on the shortest distance for each of the at least one piece of luggage in the overhead bin.

16. The apparatus of claim 13, wherein the infrared lighting unit comprises:

a cylindrical housing, wherein a diameter of the cylindrical housing is at least twice as long as a thickness of the cylindrical housing; and a plurality of infrared emitters symmetrically positioned on a lower surface of the cylindrical housing.

17. The apparatus of claim 13, wherein the at least one processor is further configured to:

transmit the overhead bin visual indicator to a crew tablet, wherein the crew tablet is configured to simultaneously display the overhead bin visual indicator for each overhead bin in the aircraft.

18. The apparatus of claim 13, wherein the light-emitting means displaying the overhead bin visual indicator in a blinking pattern for the overhead bin and at least one different overhead bin is indicative of luggage being rearrangeable between the overhead bin and the at least one different overhead bin.

19. The apparatus of claim 18, wherein the at least one different overhead bin is (a) adjacent to the overhead bin or (b) one overhead bin over from the overhead bin.

20. The apparatus of claim 13, wherein the camera comprises a camera lens that periodically monitors the interior space of the overhead bin.

* * * * *